United States Patent
McGwire

(10) Patent No.: US 12,033,199 B2
(45) Date of Patent: Jul. 9, 2024

(54) INTERACTIVE DISPLAY KIOSKS AND METHOD

(71) Applicant: TRENDS SOLUTIONS GROUP LLC, Plymouth, MI (US)

(72) Inventor: Leslie McGwire, West Bloomfield, MI (US)

(73) Assignee: TRENDS SOLUTIONS GROUP LLC, Plymouth, MI (US)

( * ) Notice: Subject to any disclaimer, the term of this patent is extended or adjusted under 35 U.S.C. 154(b) by 495 days.

(21) Appl. No.: 17/245,729

(22) Filed: Apr. 30, 2021

(65) Prior Publication Data

US 2021/0244202 A1    Aug. 12, 2021

Related U.S. Application Data

(63) Continuation of application No. 16/254,048, filed on Jan. 22, 2019, now Pat. No. 11,019,944.

(60) Provisional application No. 62/620,141, filed on Jan. 22, 2018.

(51) Int. Cl.
  *G06Q 30/0601*  (2023.01)
  *A47F 3/00*  (2006.01)
  *A47F 3/04*  (2006.01)

(52) U.S. Cl.
  CPC .......... *G06Q 30/0621* (2013.01); *A47F 3/00* (2013.01); *A47F 2003/0473* (2013.01); *G06Q 30/0643* (2013.01)

(58) Field of Classification Search
  CPC .. A47F 7/02; A47F 3/00; A47F 3/0439; A47F 3/14; A47F 2003/0473; G06Q 30/0281; G06Q 30/0621; G06Q 30/0643

USPC ........................................ 705/27.1, 26.1–27.2
See application file for complete search history.

(56) References Cited

U.S. PATENT DOCUMENTS

| | | | |
|---|---|---|---|
| 5,649,625 A | 7/1997 | Ovadia | |
| 6,179,206 B1 | 1/2001 | Matsumori | |
| 2005/0183983 A1* | 8/2005 | Ovadia | A45C 11/16 |
| | | | 211/85.2 |
| 2007/0144921 A1 | 6/2007 | Mobley | |
| 2011/0266337 A1 | 11/2011 | Reynolds | |
| 2011/0288938 A1* | 11/2011 | Cook | G08B 13/1427 |
| | | | 705/14.66 |

(Continued)

OTHER PUBLICATIONS

Burwood-Taylor, Louisa. Byte Foods Acquires Smart Fridge Kiosk Company Pantry. May 12, 2016. Published via AFN. Accessed via https://agfundernews.com/byte-foods-acquires-smart-fridge-kiosk-company-pantry (Year: 2016).*

*Primary Examiner* — Allison G Wood
(74) *Attorney, Agent, or Firm* — The Dobrusin Law Firm, P.C.; Daniela M. Thompson-Walters

(57) ABSTRACT

An interactive kiosk for displaying one or more accessories. The kiosk includes an accessory interface portion having: a) one or more accessory retainers configured to hold one or more accessories having one or more identifiers located thereon; b) one or more sensing devices configured to receive and/or transmit one or more identification signals to one or more identifiers to identify the presence and/or absence of one or more of the accessories from the one or more accessory retainers and relay one or more status signals; and c) one or more processors in communication with the one or more sensing devices configured to receive and analyze the one or more status signals from the one or more sensing devices.

20 Claims, 10 Drawing Sheets

(56) References Cited

U.S. PATENT DOCUMENTS

| | | |
|---|---|---|
| 2012/0032802 A1 | 2/2012 | Irmscher |
| 2016/0071052 A1* | 3/2016 | Henry .................. H04B 5/0062 |
| | | 235/380 |
| 2019/0114604 A1 | 4/2019 | Capogna |
| 2019/0197925 A1 | 6/2019 | Tewksbury |
| 2019/0282000 A1 | 9/2019 | Swafford |

* cited by examiner

INTERACTIVE DISPLAY KIOSKS AND METHOD

FIELD

The present teachings generally relate to a kiosk which provides an interactive experience between a user and one or more accessories displayed on the kiosk. The kiosk may be particularly useful in jewelry or other accessory retail by allowing a customer to try on and learn more about accessories while providing valuable information about the customer to the retailer.

BACKGROUND

In a typical jewelry sales environment, customers can view jewelry on display within the transparent cabinetry and displays. Generally, to try on jewelry, learn more about pricing and other features of the jewelry, a customer must approach a sales associate. The sales associate may then determine the needs of the customer. Needs of a customer may include type of jewelry interested in, if there is a special occasion related to the potential jewelry purchase, if the purchase if for the customer or for another individual(s), a budget for the purchase, and personal taste. As the sales associate develops a relationship with the customer, the sales associate may find that the customer is interested in items above their budget, are indecisive in their product tastes, or may even become uncomfortable with the sales process. If the jewelry is intended as a gift, the sales associate may determine that a customer does not know the jewelry tastes of the intended recipient. There are also times when a customer feels uncomfortable even approaching a sales associate. The customer may be concerned with being judged by a sales associate based on their own personal appearance, available budget, and the like. The customer may even be apprehensive about being pressured into a purchase. Similar concerns may arise beyond jewelry sales such as with accessories and apparel. For example, eyewear stores and formal apparel shops may face similar scenarios as jewelry.

Other times during the jewelry sale process, a customer may come in and out of a store without leaving behind any personal information for subsequent contact from the store. A sales associate may have helped the customer narrow down options in a potential jewelry item, but the customer may have to quickly leave to attend to other personal matters (e.g., childcare, work, meetings, etc). Without the customer's information, a sales associate may be unable to follow up with the customer to further or complete a sales transaction by having contact information for the client.

Sometimes an intended recipient of a jewelry gift purchase want to visit a jewelry store to gain a better understanding of their own tastes and preferences. The recipient may feel uncomfortable approaching a sales associate and trying out different jewelry items as no purchase is intended to be made. Additionally, there may be no record left of what the recipient's personal tastes are after trying on different pieces of jewelry. The recipient may then have to directly share his or her favorite jewelry items with the potential customer and thus spoiling a potential surprise, raising a conversation about budget, or both. As an alternative, a sales associate may have to document an intended recipient's tastes which not only takes additional time, but may then create an awkward conversation with the potential customer (e.g., gift giver).

What is needed is a kiosk which is able to provide an interactive experience for the customer without relying on developing a relationship with a sales associate of the retailer. What is needed is a way for a customer to comfortably physically and/or virtually try on and learn about jewelry, accessories, and/or apparel of interest without needing to interact with a sales associate. What is needed is an unconventional way for a retailer to gather customer information to more quickly determine the needs of the customer so as to provide a comfortable environment for the customer and increasing the chance of a sale. What is needed is a way for a retailer to gather customer information to allow future contact with the customer and using the gathered data for market analysis. What is needed is an unconventional approach to establishing a relationship between a potential customer and a sales associate at a retailer without having to initially interact face-to-face.

SUMMARY

The present disclosure relates to an interactive kiosk for displaying one or more accessories, the kiosk comprising an accessory interface portion having: a) one or more accessory retainers configured to hold one or more accessories having one or more identifiers located thereon; b) one or more receivers configured to receive and/or transmit one or more identification signals to one or more identifiers to identify the presence and/or absence of one or more of the accessories from the one or more accessory retainers and relay one or more status signals; c) one or more processors in communication with the one or more receivers configured to receive and analyze the one or more status signals from the one or more receivers; and wherein the accessory interface portion is configured to be in communication with a graphic interface portion to display information related to the one or more accessories.

The present disclosure relates to a system for an interactive kiosk for displaying one or more accessories, the system comprising a) an accessory interface portion having: i) one or more accessory retainers configured to hold one or more accessories having one or more identifiers located thereon; ii) one or more receivers, sensing devices, or both configured to receive and/or transmit one or more identification signals to one or more identifiers to identify the presence and/or absence of one or more of the accessories from the one or more accessory retainers and relay one or more status signals; iii) one or more processors in communication with the one or more receivers and/or sensing devices configured to receive and analyze the one or more status signals from the one or more receivers and/or sensing devices; b) a graphic interface portion having one or more graphic user interfaces in communication with one or more user input portions and configured to receive one or more user inputs related to a user, the one or more accessories, or both, wherein the graphic interface portion is in communication with the accessory interface portion; c) one or more processors in communication with the accessory interface portion, graphic interface portion, or both and configured to receive the one or more status signals, input signals related to the one or more user inputs, or both; d) one or more storage mediums in communication with the one or more processors and configured to store the one or more status signals, the input signals, or both as data entries.

The present disclosure relates to a method of operating an interactive kiosk with a control system comprising: a) a user removing one or more accessories having one or more identifiers from one or more accessory retainers of an accessory interface portion of the interactive kiosk; b) automatically detecting removal of the one or more accessories by one or more receivers, sensing devices, or both and transmitting one or more status signals; c) automatically identifying the one or more accessories removed by one or more processors upon receipt of the one or more status signals; and d) automatically displaying information related to the one or more accessories on a graphic user interface.

The present teachings provide a kiosk which may be able to provide an interactive experience by providing an accessory interface portion in communication with a graphic interface portion that are able to display and relay information regarding accessories (e.g., on display on the accessory interface portion). An accessory interface portion may be able to display accessories in a temporary removable manner so as to allow a customer to remove and try on the accessories. The accessory interface portion may be able to detect removal of one or more accessories, and may initiate one or more graphic interface portions to display information related to the one or more removed accessories to a customer. The kiosk may be able to collect and transmit information related to a customer so a retailer may be able to gather customer information, determine a customer's needs, contact a customer after they leave the retailer, or any combination thereof. The kiosk provides an unconventional approach to establishing a relationship between a sales associate and a customer by first allowing a customer to interact with the jewelry or other accessory for display on the kiosk and one or more processors using one or more algorithms to determine a user's needs (e.g., budget, tastes, items of interest) without having to interact face-to-face with a sales associate. Thus, by the time customer is ready to interact with a sales associate, the kiosk has facilitated establishing a relationship by having the sales associate already informed of the customer's needs without having the customer feel uncomfortable.

DETAILED DESCRIPTION

Figure 1:
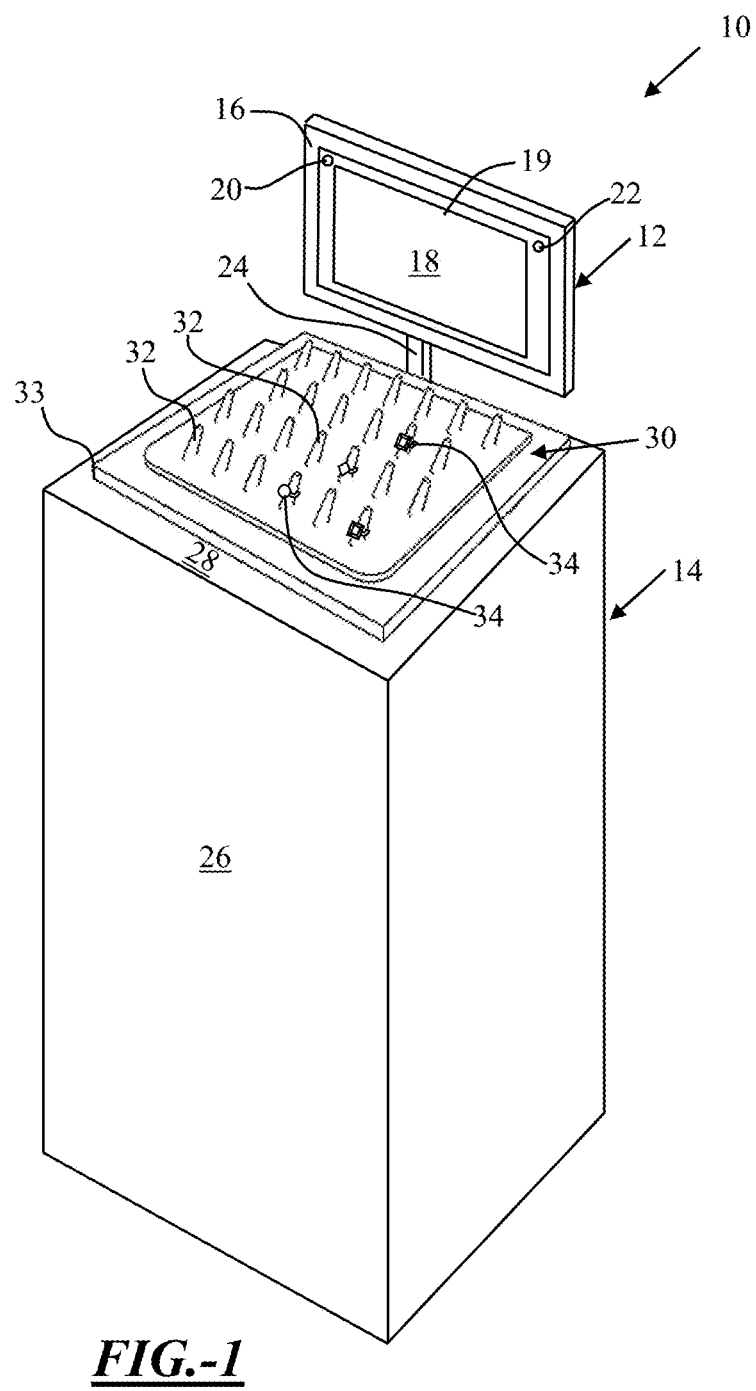
FIG. 1 is a front perspective view of an interactive kiosk.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Accessory

The present teachings provide a kiosk which may be particularly beneficial with displaying accessories and providing an interactive experience for a user. The kiosk may be used with almost any consumer good. The kiosk may be particularly advantageous for use with consumer goods which are wearable and may benefit from being on display while also allowing a user to virtually and/or physically try on (e.g., wear) the good. Wearable consumer goods may include apparel, accessories, the like, or a combination thereof. Apparel may include clothing (e.g., pants, shirts, jackets), footwear, headwear (e.g., hats), the like, or a combination thereof. Accessories may include jewelry, eyewear (e.g., eyeglasses, sunglasses), the like, or a combination thereof. Jewelry may include rings, earrings, necklaces, bracelets, watches, the like, or any combination thereof. The one or more accessories may be associated with one or more identifiers.

Identifier

One or more accessories may include one or more identifiers. The one or more identifiers may function to transmit information to one or more portions of a kiosk, identify one or more accessories, or both. The one or more identifiers may function with a portion of an accessory interface portion capable of sensing a presence of an identifier on and/or removed from an accessory interface portion. The one or more identifiers may function to transmit a signal to a transmitter (e.g., such as within an accessory interface portion). The one or more identifiers may function to relay information to a transmitter (e.g., such as within an accessory interface portion). The one or more identifiers may be any device capable of transmitting a signal to a transmitter of an accessory interface portion. The one or more identifiers may be any device capable of cooperating with one or more sensing devices for indicating the presence, absence, or both of an accessory from the accessory interface portion. The one or more identifiers may be flexible, rigid, or both. One or more identifiers may include one or more printed items, electronic circuits, transmitters, masses (e.g., weights), preprogrammed identifiers, or a combination thereof. Printed items may include letters, numbers, marks (e.g., lines, squares, etc). For example, printed items may include barcodes, QR codes, the like, or any combination thereof. One or more identifiers with electronic circuits and/or transmitters may include one or more radio frequency identification (RFID) tags, Bluetooth transmitters (e.g., iBeacon), near-field communication (NFC) transmitters, the like, or any combination thereof. The one or more identifiers may be passive, active, or both. For example, the one or more identifiers may be passive RFID tags or active RFID tags. One or more masses may include one or more weights. One or more pre-programmed identifiers may include one or more stored data entries in a storage medium related to one or more accessories, a display location on an accessory interface portion, or both. The one or more identifiers may be temporarily, semi-permanently, or permanently placed on, in, or both the one or more accessories. One or more identifiers may be attached to one or more accessories. Attached may include adhered, mechanically attached, or both. For example, an identifier may be adhered via a removable adhesive to an accessory. As another example, an identifier may be attached via a string, zip tie, threaded fastener, staple, and/or the like. One or more identifiers may be embedded into at least a portion of the accessory. For example, a weight may be embedded within an accessory. Each accessory located on an accessory display portion may have a different weight associated therewith. The one or more identifiers may rest, mate with, engage, or a combination thereof with one or more portions of an accessory interface portion. For example, the one or more identifiers may rest on an accessory interface portion when one or more accessories are on display and resting on the accessory interface portion.

The one or more identifiers may have a shape. The shape may allow the identifier to match one or more contours, engage with, nest in, rest on, or a combination thereof with an accessory, accessory interface portion, transceiver, sensing device, or a combination thereof. The shape may be at least partially reciprocal with at least a portion of an accessory interface portion, accessory, transceiver, sensing device, or a combination thereof. The shape may allow for the identifier to be minimally visible to a customer while trying on the accessory. The shape may allow for sensing and/or collecting data by one or more transceivers or other sensing devices. The identifier may have a shape which is at least partially curved, straight, or both. For example, the identifier may have a shape which is at least partially curved. The curved shape may be reciprocal with at least a portion of the accessory. For example, the curved shape may arcuate and reciprocal with at least a portion of the annular shape of a jewelry item (e.g., ring, hoop earring, etc). A curved shape may be reciprocal with at least an identifier pocket of the accessory interface portion. There may be an identifier pocket formed as a notch, groove, or indentation within an accessory retainer or base support of a display portion. For example, when an accessory is displayed on an accessory display portion, the accessory may rest on an accessory retainer while the identifier is located within and reciprocal with an identifier pocket.

Kiosk

The present teachings relate to a kiosk. The kiosk may provide an interactive experience through one or more accessory interface portions, one or more graphic interface portions, or both. The kiosk may cooperate with one or more accessories displayed thereon, one or more identifiers associated with the one or more accessories, or both. The one or more accessories may have one or more identifiers to allow for transmission of data related to the accessory to the kiosk. Data may be related to an individual accessory and/or the plurality of accessories displayed on the kiosk.

The kiosk may include one or more accessory interface portions. The accessory interface portion may function to display one or more accessories, sense movement of one or more accessories (e.g., such as by a user), transmitting user and/or accessory information to a graphic interface portion, or any combination thereof. The accessory interface portion may have any configuration suitable for displaying one or more accessories while also receiving data from one or more identifiers related to the one or more accessories thereon. The accessory interface portion may include one or more display portions, one or more base units, one or more transmitter portions, one or more sensing devices, one or more covers, or any combination thereof.

An accessory interface portion may include one or more display portions. The one or more display portions may function to retain one or more accessories having one or more identifiers, allow temporary and/or permanent removal of one or more accessories having one or more identifiers, allow a user to physically and/or virtually try on one or more accessories, or any combination thereof. The display portion may be located on, part of, or both a base unit. The display portion may be located between a base unit and a graphic interface portion. The display portion may be located adjacent to, in proximity with, and/or retain one or more transmitter portions. The one or more display portions may have any shape suitable for retaining one or more accessories having one or more identifiers. The shapes suitable for retaining the one or more accessories may be referred to as one or more accessory retainers. The shapes suitable for retaining the one or more identifiers may be referred to as identifier pockets. The one or more display portions may have a one or more shapes reciprocal and/or inverse with one or more shapes of one or more accessories, identifiers, or both. The reciprocal shape may allow for the accessory to rest or otherwise be located on the display portion for viewing, handling, or both by a consumer. The reciprocal shape may allow for an identifier to rest on, nest within, be engaged with, or otherwise be located on the displaying portion, such as for sensing by a sensing device and/or transceiver. The display portion may have one or more projections, depressions, or a combination thereof suitable for retaining the one or more accessories, identifiers, or both. The display portion may include one or more accessory retainers, identifier pockets, base supports, covers, sensing devices or a combination thereof.

One or more display portions may include one or more accessory retainers. The one or more accessory retainers may function to retain, display, and/or allow for easily handling by a consumer of one or more accessories. A shape of an accessory retainer, may be spherical, cylindrical, cuboidal, conical, prismed, pyramided, cubical, the like, or any combination thereof. The accessory retainer may have a shape which is substantially continuous, discontinuous, variable, non-variable, or any combination thereof. Discontinuous may include a surface of the accessory retainer including one or more openings. The openings may allow for one or more sensing devices to be located therein, one or more portions of an accessory to rest within, and/or the like. Variable may mean the surface of an accessory retainer having one or more contours, undulations, waves, fluctuations, protrusions, or a combination thereof. A variable surface may allow for the accessory retainer to have a shape reciprocal and/or inverse to the accessory. For example, an accessory retainer may have a surface with generally sinusoidal waves. The waves may allow for eyewear (e.g., eyeglasses, sunglasses) to rest within the accessory retainer. As another example, each accessory retainer may have a partially spherical shape (e.g., half-sphere). The spherical shape may allow for headwear (e.g., hats, headbands) to receive and/or rest on the accessory retainer. The accessory retainer may have a shape with surfaces which are substantially linear, curved, or both. For example, the accessory retainer may have one or more curved surface to conform to one or more curves of an accessory. The shape of the accessory retainer may have a uniform width, changing width, or both. An accessory retainer may have a tapering width as the retainer projects from a base support of the display portion As an example, an accessory retainer may have a substantially conical shape with a tapering width. The conical shape may allow for the outside surface of the accessory retainer to be both reciprocal and inverse to the annular shape of a jewelry ring. The tapering width may allow for the jewelry ring to be displayed along a length of the accessory retainer without slipping to the base support and while allowing for easy placement onto the accessory retainer. One or more accessory retainers may be located at an angle relative to a base support of a display portion, surface of a base unit, or both. The surface of the base support, base unit, or both the angle is measured relative to may be a surface facing upward, toward the accessory retainer, graphic interface, a consumer, or a combination thereof. An angle of a retainer may allow for aesthetically displaying one or more accessories to attract attention of a user. The angle of an accessory retainer relative to a base support and/or display portion may be perpendicular, parallel, or any angle therebetween. The angle of an accessory retainer may be an acute angle. The angle may be about 20 degrees or greater, about 30 degrees or greater, about 40 degrees or greater, or even about 45 degrees or greater. The angle may be about 80 degrees or less, about 70 degrees or less, about 60 degrees or less, or even about 55 degrees or less. For example, the angle may be from about 40 degrees to about 60 degrees. The one or more accessory retainers may include a single retainer or a plurality of retainers. A plurality of accessory retainers may be arranged in a pattern or randomly arranged. A pattern may include one or more arrays. A plurality of arrays of accessory retainers may be offset from one another, aligned in rows with one another, or both. For example, the plurality of arrays may be aligned such that they are arranged in a grid format. As another example, the plurality of arrays may be arranged in an offset pattern such that alternating arrays are aligned with one another while offset from adjacent arrays. The one or more accessory retainers may be located in proximity to one or more transmitters, may be connected to one or more transmitters, or both. The one or more accessory retainers may include, be adjacent to, or in proximity to one or more identifier pockets, sensing devices, or both. The one or more accessory retainers may be formed in, project from, or even indent into one or more base supports of a display portion.

The one or more display portions may include one or more base supports. The one or more base supports may function to support one or more accessory retainers, identifier pockets, transmitter portions, sensing devices, or a combination thereof. The one or more base supports may cooperate with or be part of a base unit. The one or more base supports may have a shape which is generally spherical, cylindrical, cuboidal, conical, prismed, pyramided, cubical, the like, or any combination thereof. The one or more base supports may have a shape at least partially or substantially reciprocal and/or inverse with a surface, shape, or both of a base unit. The base support may have a shape reciprocal and inverse with a well of a base unit. For example, the base support may have a substantially cuboidal shape which rests within a well of a base unit having a hollowed cuboidal shape. The base support may have a surface which is substantially reciprocal with a surface of a base unit. For example, the base support may have a substantially flat bottom surface (e.g., opposite the one or more accessory retainers) which rests on a substantially flat upper surface of a base unit. The base support may include or be free of one or more feet and or legs. The base support may be able to be positioned on any surface without requiring a base unit or the base support may rest on the base unit. The base support may include or be free of one or more anti-scratch or anti-slip features affixed thereon. The one or more anti-scratch or anti-slip features may be located on a surface which rests on a surface of the base unit, another surface, or both (e.g., opposite the one or more accessory retainers, identifier pockets, or both). A base support may house or be free of housing one or more components of a transmitter portion. The base support may include one or more receptacles for housing the one or more components of the transmitter portion. The one or more receptacles may be located adjacent to and/or in proximity with the one or more accessory retainers, identifier pockets, sensing devices, or a combination thereof. The one or more receptacles may be located between a bottom surface and upper surface of the base support. The one or more receptacles may be located between a bottom surface and one or more accessory retainers, identifier pockets, or both of the base support.

One or more display portions may include one or more identifier pockets. The one or more identifier pockets may function to receive, mate, and/or engage with one or more identifiers; retain one or more identifiers. The identifier pocket may be formed as part of an accessory retainer, a base support, or both of the display portion. The identifier pocket may be formed in a surface of the accessory retainer. The identifier pocket may be located adjacent to or in proximity with the accessory retainer. The identifier pocket may be formed as an indentation, project, or both from a surface of an accessory retainer, base support, or both. The identifier pocket may be adjacent to, in proximity with, or even house one or more sensing devices. For example, the identifier pocket may include an opening for a sensing device to rest within. The opening may allow for a sensing device to be located adjacent to an identifier when an accessory is located on the display portion. A shape of an identifier pocket may be spherical, cylindrical, cuboidal, conical, prismed, pyramided, cubical, the like, or any combination thereof. The shape of the identifier pocket may be substantially reciprocal with a portion or all of an identifier. The shape of the identifier pocket may allow for an identifier to be located within, nested, and/or even engaged with the identifier pocket. The identifier pocket may have a shape which is substantially continuous, discontinuous, variable, non-variable, or any combination thereof. Discontinuous may include a surface of the identifier pocket including one or more openings. The openings may allow for one or more sensing devices to be located therein, project therethrough, or even a window for the sensing device to detect the presence or read information of an identifier. For example, an opening may allow for a barcode and/or QR code to be read by one or more scanners located underneath the accessory retainers. As another example, the opening may allow for an electrical connection to be established between the identifier and a transmitter portion. Variable may mean the surface of an identifier pocket having one or more contours, undulations, waves, fluctuations, protrusions, or a combination thereof. A variable surface may allow for the identifier pocket to have a shape reciprocal and/or inverse to the identifier. For example, an identifier pocket may be formed as a curve notch within an accessory retainer. The curved notch may receive an identifier having a similar contour, such as an identifier contoured to the shape, embedded within, or formed as part of a jewelry ring. As another example, an identifier pocket may have a substantially cuboidal shape formed in the base support and/or accessory retainer and reciprocal with a tag-like identifier. The identifier may then be able to rest flat within the identifier pocket. By having the identifier located within a reciprocal shape of the identifier pocket, the identifier may be aligned for better accuracy in reading and/or sensing by one or more portions of a transmitter, sensing device, or both. One or more identifier pockets may include a single identifier pocket or a plurality of identifier pockets. Each accessory retainer may be associated with a respective identifier pocket. Each identifier pocket may be located such that it is at least partially hidden from view from a consumer. The identifier pocket may be located behind, or on a back surface, or an accessory retainer. Behind or a back surface may be a surface opposite a forward-facing, consumer-viewing, side of a display portion. Behind or a back surface may be a portion facing toward a graphic user interface. The one or more identifier pockets may have a configuration similar to that of the plurality of accessory retainers (e.g., one or more arrays).

One or more display portions may include one or more covers. The one or more covers may function to allow for displaying and protecting one or more accessories. The one or more covers may be placed over one or more accessory retainers. The one or more covers may be transparent to allow a user to see one or more accessories stored within the display portion. The one or more covers may be removable. The one or more covers may be securely affixed to a base support, base unit, or both. The one or more covers may allow for accessories to be stored in a secure manner. For example, one or more covers may be placed over one or more accessory retainers (and accessories) when a store is closed while still allowing viewing (e.g., "window shopping") of the accessories stored therein.

One or more display portions may include one or more sensing devices. The one or more sensing devices may function to sense the presence, removal, and/or absence of one or more accessories, identifiers, or both. The one or more sensing devices may be any sensor or combination of sensors suitable for detecting the presence, placement, absence, removal, duration of absence, duration of presence, or any combination thereof of one or more accessories, identifiers, or both from a display portion. Exemplary sensors may include one or more mass sensors, capacitive sensors, infrared sensors, laser sensors, ultrasonic sensors, membrane sensors, radio frequency (RF) admittance sensors, radio frequency (RF) capacitance level sensors, conductive sensors, optical interface sensors, microwave sensors, the like, or combination thereof. The one or more sensing devices may be in electrical communication with, be, or even be part of, one or more transmitters, receivers, processors, the like, or any combination thereof. The one or more sensing devices may include one or more readers. The one or more readers may include one or more barcode scanners, QR code scanners, RFID readers, or a combination thereof. The one or more sensing devices may include or be one or more receivers as discussed herein. The one or more sensing devices may be in electrical communication with any part of a system which is able to receive and/or interpret one or more signals from one or more sensing devices. The one or more sensing devices may be located in one or more accessory retainers, identifier pockets, base supports, or a combination thereof. The one or more sensing devices may be located such that they can have line of sight, in physical contact, or both with one or more accessories, identifiers, or both. The one or more sensing devices may be located in or near a portion in which an identifier may be located. The one or more sensing devices may be located in or have line of sight via one or more openings in the display portion.

An accessory interface portion may include one or more base units. The one or more base units may function to support and/or house one or more components of the accessory interface portion, graphic interface portion, transmitter portion, or any combination thereof. One or more components of an accessory interface portion may include a display portion, transmitter portion, or both. The one or more base units may have any three-dimensional shape suitable for displaying one or more accessories. The shapes of a base unit may be spherical, cylindrical, cuboidal, conical, prismed, pyramided, cubical, the like, or any combination thereof. The one or more base units may have a height which allows the one or more accessories on display, accessory retainers, or both to be both viewable and reachable by one or more consumers. The one or more base units may have a height suitable for resting at ground level, a working surface (e.g., counter, table), the like, or a combination thereof. A base unit may have a height of about 1 inch or greater, about 5 inches or greater, or even about 12 inches or greater. A base unit may have a height of about 50 inches or less, about 40 inches or less, about 35 inches or less, about 30 inches or less, or even about 25 inches or less. A base unit may have a height about equal to standard, counter, or even bar table height. A base unit may have a shorter height suitable for being located on surface having a standard, counter, or bar table height. The one or more base units may include one or more surfaces suitable for retaining one or more display portions, serving as one or more display portions, or both. An upper surface may have a display portion (e.g., base support) resting thereon, therein, or both. At least part of a display portion may be integral with the base unit. For example, a base support of a display portion may be the same as the upper surface of the base unit.

The base unit may include one or more projections, depressions, or both for receiving at least part of a display portion. For example, a well may be formed within the upper surface which is configured to receive a display portion therein. The well may have a shape substantially reciprocal and/or inverse with a shape of at least part of a display portion. The well may have a shape reciprocal and inverse with a base support of a display portion. The display portion may rest at least partially within the well. For example, the base support may rest within the well while the one or more accessory retainers are exposed and easily accessible. The well may be in proximity to a transmitter portion.

The base unit may be formed by a plurality of walls. The walls may function to house, support, conceal, and/or protect one or more components of a transmitter portion, display portion, graphic interface portion, or a combination thereof. walls may include side walls, bottom walls, one or more walls which form an upper surface, or a combination thereof. The walls may form a hollow interior therein. One or more of the walls may be temporarily removable. For example, one or more of the walls may include a door affixed to another wall via one or more hinges. A base unit may include one or more locking mechanisms. The one or more locking mechanisms may limit access into the accessory interface portion to protect one or more components. The one or more locking mechanisms may be part of a door of the base unit. For example, the door may include a lock which latches to an adjacent wall when the door of the base unit is closed. The hollow portion may allow for storage of one or more electrical components, one or more components of a transmitter portion, or any combination thereof. The hollow portion may include one or more storage portions therein, such as one or more shelves.

An accessory interface portion may include one or more transmitter portions. The one or more transmitter portions may function to transmit and/or receive one or more signals related to one or more accessories. The one or more transmitter portions may be any component capable of receiving and/or transmitting a signal related to one or more accessories, identifiers, or both. The one or more transmitter portions may include one or more sensing devices, receivers, processors, communication modules, power modules, or any combination thereof. The one or more transmitter portions may reside within a display portion, base unit, outside of either, or a combination thereof. The one or more transmitter portions may be in electrical communication with one another, one or more components of a system, or both. The one or more transmitter portions may be integrated together into one component, a plurality of components in electrical communication with one another, or a combination thereof.

One or more transmitter portions may include one or more receivers. One or more receivers may function to activate, receive and/or transmit one or more signals related to one or more identifiers, accessories, processors, storage mediums, or any combination thereof. The one or more receivers may be located adjacent to (e.g., below), within, and/or in proximity to a display portion. One or more receivers may be part of or located within one or more accessory retainers. One or more receivers may include or be connected to one or more sensing devices of a display portion. One or more receivers may be part of a graphic user interface. One or more receivers may even be separate from the kiosk itself. For example, a receiver may be included as part of mobile phone or tablet. The one or more receivers may be any receiver capable of receive a signal from one or more identifiers. The one or more receivers may include one or more sensing devices (e.g., mass sensor), radio frequency transmitters, barcode readers, Bluetooth transmitters, near-field communication transmitters, cameras, the like, or any combination thereof. One or more barcode readings may include pen type readers (i.e., barcode wands), laser scanners, CCD readers, camera-based readers, or a combination thereof. The one or more receivers may be in communication with one or more processors.

A signal from one or more identifiers, one or more accessories, or both may be referred to as one or more identification signals. Presence, absence, and/or movement of an identifier, accessory, or both relative to a display portion may cause an identification signal to be received by the receiver, may cause the identification signal to no longer be transmitted to the receiver, or both. Upon receipt, the absence, or both of an identification signal by one or more receivers, the one or more receivers may transmit a status signal to a processor. Movement may include placement onto a display portion, removal from a display portion, movement on the display portion, the like, or any combination thereof. The one or more receivers may transmit and/or stop transmitting one or more signals related to the identification signal to one or more data processors.

The one or more transmitter portions may include one or more processors (e.g., data processors). The one or more processors may function to interpret, analyze, and/or direct one or more signals from one or more identifiers, sensing devices, receivers, or any combination thereof. The one or more processors may convert one or more signals to one or more data signals, transmit one or more signals and/or data signals to one or more storage mediums, or a combination thereof The one or more processors may be part of a transmitter portion, system, or both. The processor may be part of (integrated into) a receiver, in electrical communication with the receiver, or both. The one or more processors may be located within, outside of, or both the accessory interface portion. The one or more processors may be part of the transmitter portion, an external server, the like, or any combination thereof. The one or more processors discussed hereinafter with respect to the system may be suitable as or be the one or more processors of the one or more transmitter portions.

One or more signals related to one or more identification signals transmitted from a receiver to a processor may be referred to a status signal. A status signal, chance in status signal, or both may indicate placement, removal, movement, presence, absence, or a combination thereof of one or more accessories, identifiers, or both from a display portion. For example, a status signal no longer being received may indicate an identification signal is no longer being received which may mean an accessory and/or identifier indicated by the identification signal has been removed from the display portion (e.g., has been picked up by a consumer for better viewing). As another example, a status signal being received may indicate an identification signal has also been created and an accessory and/or identifier indicated by the identification signal has been located onto the display portion (e.g., has been put back on the display portion by a consumer). The processor may determine which particular accessory and/or identifier a status signal is related to based on one or more algorithms. A processor may access one or more identification algorithms (e.g., software, instructions). The one or more identification algorithms may relate a specific identifier to a specific accessory, location on display portion, or both. The one or more identification algorithms may be stored within a non-transitory storage medium. The storage medium may be integrated with the processor or in communication therewith. The storage medium may be part of the kiosk the overall system, or both. The processor may be powered by a power module.

The one or more transmitter portions may further include one or more power modules. The one or more power modules may provide and/or route power to one or more components of a kiosk needed electrical power. The one or more components may include one or more components of an accessory interface portion, graphic interface portion, or both. The one or more components may include one or more components or portions of a transmitter, such as the receiver, processor, storage medium, sensing devices, the like, or a combination thereof. The one or more power modules may include a power source or be connectable with a power source. For example, the one or more power modules may include one or more AC adapters, AC/DC adapters, AC/DC converters, the like, or any combination thereof. The one or more power modules may be in direct and/or indirect electrical communication with one or more components of the kiosk. The one or more power modules may also power at least a portion of a graphic interface portion.

The kiosk may include or be in communication with one or more graphic interface portions. The graphic interface portion may function to display information related to one or more accessories displayed on an accessory interface portion; receive user inputs related to the user and/or one or more accessories; provide for a receiver; or a combination thereof. The graphic interface portion may display information (e.g., price, details, etc.) related to one or more accessories. The information may be displayed upon removal, or other indication/selection, of an accessory from an accessory interface portion (e.g., display portion). The graphic interface portion may include one or more processors. The one or more processors may be separate from or the same as the one or more processors of an accessory interface portion, transmitter portion, or both. The one or more processors may receive the one or more identification signals, status signals, or both. Via one or more identification algorithms, the processor may display the information related to the accessory onto a portion (e.g., screen, user interface) of the graphic interface portion. The graphic interface portion may display one or more other accessories (e.g., on display or separate from the accessory interface portion) which may be similar to one or more accessories removed from the accessory interface portion. One or more processors may execute one or more similarity algorithms. The similarity algorithms may be stored within a storage medium, accessible and executable by the processor. The similarity algorithms may be triggered by the accessory identified by one or more identification algorithms. The graphic interface portion may allow for inputting of information related to the user (e.g, contact information, interests, demographic information, etc). The graphic interface portion may allow for transmission of user information to one or more other processors, storage mediums, other computing devices, or a combination thereof for subsequent use by a retailer. The graphic interface portion may be affixed to, in communication with, or separate from an accessory interface portion. For example, a graphic interface portion may be affixed to an accessory interface portion via one or more supports. A graphic interface portion may include one or more mounts. The one or more mounts may function to retain one or more graphic user interfaces.

One or more graphic interface portions may include one or more graphic user interfaces. The graphic user interfaces may function to display information related to one or more accessories, related accessories, or both; receive input from one or more users; or any combination thereof. The one or more graphic user interfaces may be affixed to the kiosk, mobile, or both. One or more graphic user interfaces may be part of one or more computing devices. One or more graphic user interfaces may include one or more interfaces capable of relaying (display, audible) information (e.g., data entries) to a user, receiving information (e.g., data signals) from a user, or both. One or more graphic user interfaces may display information related to one or more accessories, identifiers, or both. One or more graphic user interfaces may display information determined by one or more algorithms. The one or more graphic interfaces may include one or more screens. The one or more screens may be a screen located directly on the kiosk, another computing device, or both. The one or more graphic user interfaces may include a tablet, mobile phone, monitor screen (e.g., affixed to one or more data processors), the like, or a combination thereof. The graphic user interface may reside within the mount, be located onto the mount, or both. The graphic user interface may include and/or be in communication with one or more user inputs.

The one or more user inputs may allow for receiving of one or more inputs from a user. The one or more user inputs may include one or more keyboards (separate from or part of a screen), cameras, microphones, any other input device, the like, or any combination thereof. The graphic user interface portion may further include one or more cameras or be in communication with one or more cameras. For example, a camera may be part of a graphic user interface or separate therefrom. A camera may be part of one or more computing devices. One or more computing devices may include a mobile device in communication with and/or including the graphic user interface. Communication may be direct, via a network, or both. For example, a user's mobile phone having a camera therein may be connected to a WI-FI based network having the kiosk integrated therein. The network may thus allow for communication between the mobile phone and kiosk. The graphic interface portion may further include one or more speakers, microphones, or both to allow receiving of one or more user inputs (e.g., voice recognition, voice-to-text), relaying communication to a user, or both. The one or more graphic interface portions may be in communication with a communication hub.

System

The kiosk may be part of an overall system. The system may function to receive and/or transmit data to the accessory interface portion, graphic interface portion, one or more other computing devices, or any combination thereof.

The system may include a communication hub. The communication hub may function to receive, transfer, or both one or more signals. The signals may be from one or more accessory interface portions, graphic interface portions, computing devices, the like, or any combination thereof. The communication hub may be any type of communication hub capable of sending and transmitting data signals over a network to a plurality of computing devices. A communication hub may include a wired router, a wireless router, or both. The communication hub may place the graphic interface portion, accessory interface portion, or both in communication with each other, with one or more computing devices, with a network, one or more storage mediums, one or more processors, or a combination thereof. The communication hub may allow for communication of a computing device with an accessory interface portion, graphic interface portion, or both when the computing device is directly connected, indirectly connected, or both to the communication hub. A direct connection to the communication hub may mean that the computing device and/or kiosk is directly connected to the communication hub via a wired and/or wireless connection, and communicates with another computing device or kiosk through the communication hub. An indirect connection to the communication hub may mean that a computing device and/or kiosk first communicates with one or more other computing devices via a network before transmitting and/or receiving one or more signals to and/or from the communication hub and then computing device and/or kiosk.

The system may include one or more networks. The one or more networks may be formed by placing one or more portions of the kiosk in communication with one or more other computing devices. The network may include a communication hub as part of the network. One or more networks may be connected to one or more other networks. One or more networks may include one or more local area networks (LAN), wide area networks (WAN), intranet, Internet, the like, or any combination thereof. The network may be temporarily, semi-permanently, or permanently connected to one or more computing devices. The one or more computing devices may include one or more onsite computing devices. Onsite computing devices may include one or more laptops, personal computers, mobile phones, mobile tablets, the like, or any combination thereof which are part of the environment in which the kiosk is located. For example, an onsite computing device may include a computer located in an office or desk of a retailer accessible by sales associates. As another example, an onsite computing device may include mobile device (e.g., mobile phone or tablet) associated with the retailer and/or an employee of the retailer. The network may allow for one or more personal computing devices of a user to be temporarily connected thereto to transmit one or more user inputs to one or more processors. The one or more networks may function to allow transmission of one or more signals for processing, storage, or both.

The system may include one or more processors. The one or more processors may function to analyze one or more signals related to data from an accessory interface portion, graphic interface portion, one or more storage mediums, or more other data processors, one or more computing devices, or any combination thereof. The one or more processors may function to execute one or more algorithms. The one or more processors be part of, separate from, or both relative to one or more portions of a kiosk. One or more processors may be in communication with one or more other processors. The one or more processors may function to process data, execute one or more algorithms to analyze data, apply on or more rules, evaluate data against one or more rules, or any combination thereof. Processing data may include receiving, transforming, outputting, executing, the like, or any combination thereof. One or more processors may be part of one or more hardware, software, systems, or any combination thereof. One or more hardware processors may include one or more central processing units, multi-core processors, front-end processors, the like, or any combination thereof. One or more software processors may include one or more word processors, document processors, the like, or any combination thereof. One or more system processors may include one or more information processors, the like, or a combination thereof. The one or more processors may be located within a same or different non-transient storage device as one or more storage mediums, other processors, receivers, communication modules, communication hubs, or any combination thereof. The one or more processors may include one or more cloud-based processors. A cloud-based processor may be located remote from an interactive kiosk, communication hub, computing device, graphic interface, transmitter portions, one or more other processors, one or more storage mediums, one or more databases, the like, or any combination thereof. One or more cloud-based processors may be accessible via one or more networks. One exemplary cloud-based processor may be Amazon Elastic Compute Cloud™ (EC2™) may be provided by Amazon Web Services®, incorporated herein by reference in its entirety for all purposes. Another suitable platform for a cloud-based processor may include Lambda™ provided by Amazon Web Services®, incorporated herein in its entirety by reference for all purposes. The one or more processors may convert data signals to data entries to be saved within one or more storage mediums. The one or more processors may access one or more algorithms to analyze one or more data entries and/or data signals. The one or more processors may access one or more algorithms saved within one or more memory storage mediums.

The one or more processors may transmit data (e.g., signals, data entries) to and/or receive data from one or more storage mediums, accessory interface portions, graphic interface portions, graphic user interfaces, computing devices, receivers, communication modules, communication hubs, or any combination thereof.

One or more algorithms stored within the one or more processors, storage mediums, or both may be configured to utilize one or more identifier signals, status signals, or both to determine data related to the one or more signals (e.g., related to the accessory), correlate stored data related to an accessory, transmit data related to an accessory, transmit data related to accessories similar to the accessory, or a combination thereof. One or more algorithms may correlate customer input data to data related to one or more accessories. One or more algorithms may determine a user's needs (e.g., personal taste, budget, accessories of particular interest, etc) based on one or more accessories removed from an accessory interface portion by a user, one or more user inputs provided at a kiosk by a user, or both. The one or more processors may relay data based on a user's needs to one or more computing devices located on-site. This may be particularly advantageous in establishing a relationship with a sales associate and understanding the customer's needs before meeting with the customer (e.g., user of the kiosk). The one or more data processors may relay information related to a customer's inputs to one or more other processors, storage mediums, or computing devices outside of the site of the kiosk. For example, the one or more data processors may include one or more algorithms thereon which may create a wish list for a user. For example, the one or more data processors may relay photos of a user with accessories from the kiosk. One or more data processors may include one or more algorithms thereon configured to receive customer's inputs (e.g., photograph, such as a "selfie") to allow a customer to virtually try on one or more accessories without having to physically try on the accessory. For example, a customer may take a selfie via a graphic interface portion or separate mobile device while wearing an accessory (e.g., ring) from the accessory interface portion. Via the graphic user interface, the customer may then change an accessory to see how a subsequent accessory appears on the individual while the graphic user interface also display information related to the subsequent accessory. Data and/or transmitted by a data processor may stored and/or retrieved from one or more storage mediums.

The system may include one or more storage mediums. The one or more storage mediums may function to receive one or more data entries from one or more components of the system, kiosk, or both. The one or more storage device may include one or more a non-transient storage devices. A non-transient storage device may include one or more physical servers, virtual servers, or a combination of both. One or more servers may include one or more local servers, remote servers, or both. A non-transient storage device may include one or more memory storage devices. One or more memory storage devices may include one or more hard drives (e.g., hard drive memory), chips (e.g., Random Access Memory "RAM"), discs, flash drives, memory cards, the like, or any combination thereof. The one or more storage mediums may include one or more cloud-based storage mediums. A cloud-based storage medium may be located remote from an interactive kiosk, business location in which the kiosk is located, a computing device, one or more processors, one or more databases, or any combination thereof. Cloud-based may mean that the one or more storage mediums may reside in a non-transient storage medium located remotely from the interactive kiosk, business location, communication hub, and the like. One or more cloud-based storage mediums may be accessible via one or more networks. A suitable cloud-based storage medium may be Amazon S3™ provided by Amazon Web Services®, incorporated herein by reference in its entirety for all purposes. One or more storage mediums may store one or more data entries in a native format, foreign format, or both. One or more storage mediums may store data entries as objects, files, blocks, or a combination thereof. The one or more storage mediums may include one or more algorithms, rules, databases, data entries, the like, or any combination therefore stored therein. The one or more memory storage mediums may store data in the form of one or more databases.

The system may include one or more databases. One or more databases may function to receive, store, and allow for retrieval of information related to one or more accessories, similar accessories, identifiers, customers (e.g., users), or any combination thereof. The databases may include any type of database able to store digital information. The digital information may be stored within one or more databases in any suitable form using any suitable database management system (DBMS). Exemplary storage forms include relational databases (e.g., SQL, row-oriented, column-oriented), non-relational databases (e.g., NoSQL database), correlation databases, ordered/unordered flat files, structured files, the like, or any combination thereof. The one or more databases may store one or more classifications of data models. The one or more classifications may include column (e.g., wide column), document, key-value (e.g., key-value cache, key-value store), object, graph, multi-model, or any combination thereof. The databases may be located within or be part of hardware, software, or both. One or more databases may be stored on a same or different hardware and/or software as one or more other databases. The databases may be located within one or more non-transient storage devices. One or more databases may be located in a same or different non-transient storage device as one or more other databases. The one or more databases may be accessible by one or more processors to retrieve data entries for analysis via one or more algorithms. The one or more databases may be one or more cloud-based databases. Cloud-based may mean that the one or more databases may reside in a non-transient storage medium located remote from the interactive kiosk, kiosk location, and the like. One or more cloud-based databases may be accessible via one or more networks. One or more databases may include one or more databases capable of storing one or more conditions, characteristics, or both of one or more kiosks, identifiers, accessories, similar accessories, customers, inventory, merchant locations, user logins, personnel logins, the like, or any combination thereof. One suitable database service may be Amazon DynamoDB® offered through Amazon Web Services®, incorporated herein in its entirety by reference for all purposes.

The one or more databases may have one or more data entries stored therein. The one or more data entries may be related to one or more accessories, similar accessories, identifiers, customers, kiosk locations (e.g., stores, location), inventory, the like, or any combination thereof. The one or more data entries may be stored in the same or differing databases. The one or more data entries may include one or more accessory entries, similar accessory entries, identifier entries, customer entries, kiosk information entries, inventory entries, the like, or any combination thereof. The one or more data entries may be related to one or more other data entries. One or more keywords, estimated cost values, or both may relate one accessory to one or more similar accessories. One or more keywords may be text which describes one of the accessories, similar accessories, customers, kiosk locations, the like, or a combination thereof. One or more keywords may include words which describe one or more characteristics of the accessories, customers, kiosk locations, and the like. For example, of the one or more accessories include jewelry, the one or more keywords may include a jewelry type (e.g., necklace, ring, earrings, bracelet, etc.); cut (e.g., princess, oval, round, emerald, etc.); stone or gem (e.g., diamond, sapphire, pearl, etc.); metal (e.g., silver, gold, platinum, etc.); and the like, or a combination thereof. Each accessory data entry may be tied to a single keyword or a plurality of keywords. Each accessory data entry may be related to a sale price data entry. For example, an accessory data entry identified as a jewelry item (e.g., ring) may be associated with an estimated cost value data entry. The estimated cost value data entry may be the sale price of the associated accessory data entry, similar accessory data entry, or both. Each accessory data entry may be related to an identifier data entry. The identifier data entry may function to relate an identifier to an accessory. For example, the identifier data entry may be a certain serial number associated with a barcode or RFID tag that is intended to specify a specific accessory. One or more customer data entries may include one or more data entries related to a customer who interfaces with the kiosk. The one or more customer data entries may include a login id, password, customer first name, last name, email address, phone number, mailing address, other contact information, gender, age, interest in a particular accessory, occasion of interest for an accessory (e.g., wedding, birthday, gift), budget willing to spend on an accessory, preferences related to an accessory (eg., preferences in characteristics) the like, or any combination thereof. The one or more customer data entries may include one or more photos taken by the customer. The photos may be photos taken by a camera of a graphic user interface. The one or more customer data entries may also include one or more accessories, similar accessories, or both which the customer may remove from the kiosk (e.g., to try on, of interest), may indicate as interested in (e.g., via a user input), may indicate as undesirable (e.g., via a user input), may indicate as uninterested in (e.g., via lack of removal from the kiosk), the like, or a combination thereof.

The one or more storage mediums, processors, or both may include one or more algorithms stored therein. The one or more algorithms may function to determine a status of an accessory relative to a kiosk, preferences of a user, the like, or a combination thereof. The one or more algorithms may be stored on the same or different storage mediums, processors, or both. The one or more algorithms may be accessible, executable, or both by the same or different processors. The one or more algorithms may include one or more status algorithms, identification algorithms, similarity algorithms, customer algorithms, the like, or any combination thereof. The one or more status algorithms may function to determine a status of an accessory, identifier, or both relative to a kiosk. The one or more status algorithms may function to convert one or more identification signals to one or more status signals. For example, an identifier being located in proximity to a receiver may trigger an identification signal. The one or more status algorithms may convert the identification signal to a status signal indicating the presence of the accessory on the kiosk. As another example, an identifier may be moved beyond a receiver's reach or a certain distance from a receiver (e.g., removed from the kiosk by a user). The one or more status algorithms may convert the identification signal to a status signal indicating the absence or movement of the accessory on the kiosk. The one or more identification algorithms may function to relate a specific identifier to a specific accessory, location on a kiosk or both; identify an accessory of interest to a user; or any combination thereof. The one or more identification algorithms may be triggered by one or more status algorithms. For example, a status algorithm indicating removal of an accessory, identifier, or both from a kiosk may trigger an identification algorithm. An identification algorithm may be able to determine based on an identifier signal, status signal, result from a status algorithm, which accessory, identifier, or both has been removed from the kiosk. An identification algorithm cause display of the accessory, accessory related to the identifier, or both, onto a graphic interface portion. The identification algorithm may access one or more accessory data entries stored in one or more databases, convert the one or more accessory data entries to data signals, display the one or more accessory data entries on a display, or any combination thereof. For example, upon picking up a particular jewelry ring located on an accessory retainer, the status algorithm may be executed. The status algorithm may determine that particular jewelry ring has been removed from the kiosk. The status algorithm by indicating removal may then trigger the identification algorithm. The identification algorithm may cause one or more accessory data entries specific to the removed jewelry ring to be displayed on the graphic interface portion. Execution of one or more identification algorithms may cause one or more similarity algorithms to be executed. One or more similarity algorithms may function to identify one or more similar accessories, or both which a customer may be interested in. The one or more similar accessories may or may not be physically displayed on the kiosk. The one or more similarity algorithms may compare one or more keyword data entries (e.g., characteristics) of an accessory identified by the identification algorithm to one or more keyword data entries of one or more other accessories stored within one or more accessory databases. The one or more similarity algorithms may then filter one or more databases for one or more accessories, similar accessories, or both which have one or more same or similar keyword data entries. The one or more similarity algorithms may then cause one or more accessories which share same or similar keyword data entries to an accessory as determined by an identification algorithm to be displayed on a graphic interface portion. One or more similarity algorithms may store, associate with the customer, or both one or more similar accessories selected by a user via a user interface as one or more accessory data entries, similar accessory data entries, or both. One or more customer algorithms may function to store, display, or both one or more customer preferences. The one or more customer algorithms may associate one or more accessories removed from a kiosk by a user with the user. For example, one or more accessory data entries may be associated with one or more customer data entries. The one or more customer algorithms allow for determining the one or more accessories of interest, similar accessories, or both to a user (e.g., customer) of the kiosk. The one or more customer algorithms may result in displaying one or more accessories held by a user, the accessories held (e.g., absent from the kiosk) for longer periods of time, similar accessories, similar accessories selected as of interest, or any combination thereof onto a graphic user interface separate from that of the kiosk (e.g., computing device for sales associate).

The one or more algorithms may include one or more learning algorithms. The one or more learning algorithms may allow for the use of artificial intelligence to learn user preferences, recommend accessories to users, or both. The one or more learning algorithms may store data related to one or more characteristics of one or more accessories, customers, kiosk locations. The one or more learning algorithms may determine trends of user preferences based on the characteristics. The one or more learning algorithms may recommend accessories to users based on the stored data, trends, or both. For example, a kiosk located in New York City, New York may learn that women between ages 20 to 30 may prefer platinum rings with a princess cut gemstone while in Lexington, Kentucky women in the same age range may prefer white gold rings with a round cut gemstone. Based on the trends, the learning algorithm may suggest and display one more accessories to user. The one or more learning algorithms may even suggest alternative accessories not identified by the similarity algorithms. The one or more learning algorithm may interact with a user to problem solve issues with budget. As an example, the learning algorithm may identify accessories that share similar characteristics with those the user shows preference toward but also falls within the user's budget. The one or more learning algorithms may even learn when a user is ready to interact with a sales associate, alert a sales associate to assist the user, or both. The learning algorithm may determine that once a user is holding an accessory for a certain duration of time, picks up the same accessory repeatedly, and the like, the user is more likely to make a purchase of the accessory or a similar accessory.

Method of Using Kiosk

The teachings herein further relate to a method of using the kiosk. Using the kiosk may include one or more of the following steps: relating one or more identifiers to one or more accessories, placing one or more accessories on an accessory interface portion of a kiosk for display, removing one or more accessories from the kiosk, displaying one or more characteristics related to the one or more accessories on a graphic interface portion, displaying one or more characteristics related to one or more similar accessories on the graphic interface portion, storing one or more data entries related to the one or more accessories or similar accessories with user information in one or more databases, and any combination thereof.

The method may include relating one or more identifiers to one or more accessories. This step may function to directly relate an identifier to an accessory such that the identifier working with one or more other components (e.g., sensing device, receiver, transmitter, processor, storage medium, algorithms) can identify the accessory. Relating may include attaching or integrating one or more identifiers to one or more accessories. Attaching may include securing via adhesive, mechanical attachments, the like, or a combination. Integrating may include forming or otherwise molding onto the accessory. Relating one or more identifiers may include forming the identifier itself. Forming may include printing in 2D or 3D format. For example, an RFID tag or mass of weight useful as identifiers may be formed by 3D printing. As another example, barcodes may be printed. Relating one or more identifiers to one or more accessories may include storing one or more identifier data entries, accessory data entries, or both in one or more databases. One or more databases may include an identifier database, accessory database, or both. The databases may be a single database or a plurality of databases. The method of relating the data entries may be based on the number of databases and their configurations. For example, in a single database, each row may be dedicated to each individual accessory. The identifier data entry identifying a single accessory may be located within that same row. As another example, in the case of a plurality of databases, a keyword that links over to another database and a specific accessory data entry may be located in a same row as the identifier data entry.

The method may include placing one or more accessories on the accessory interface portion. This step may function to place the accessories for display, allow the one or more accessories and/or identifiers to interact with one or more components of the kiosk, or both. The method may include placing one or more accessories, identifiers, or both onto a display portion. The one or more accessories may be located onto, into, or both one or more accessory retainers. Each accessory may be located onto a respective accessory retainer. The one or more identifiers may located onto, in proximity to, or both the display portion, a receiver, sensing device, or a combination thereof. The one or more identifiers may be located such that they be sensed by one or more components of the kiosk. The one or more identifiers may be located onto, into, or both one or more identifier pockets. Placing the one or more accessories, identifiers, or both onto a display portion may create one or more identifier signals to be created. The one or more identifier signals may be established between one or more accessories and/or identifiers and one or more sensing devices and/or receivers. The one or more identifier signals may be converted to one or more status signals. The one or more status signals may be created by one or more status algorithms. The one or more status signals may indicate the placement (e.g., presence, movement) of one or more accessories, identifiers, or both onto the accessory interface portion. Placing the one or more accessories and/or identifiers onto a display portion may include storing placement data entries into one or more databases. The one or more databases may be the same as or different as the ones including identifier data entries, accessory data entries, or both stored therein. Placement data entries may relate a location of an accessory on a display portion to an accessory. For example, an accessory data entry may be in a same row as a placement data entry indicating the location of an accessory on a display.

The method may include a user removing one or more accessories from an accessory interface portion. Removal of the one or more accessories may allow for a user to try on the one or more accessories, better see the one or more accessories, or both. The user may remove one or more accessories from a display portion. Removal of the accessory may result in removal of one or more accessories, identifiers, or both from one or more accessory retainers, identifier pockets, or both. Upon removal of an accessory, one or more identifier signals may be created, alternated, or stopped. The one or more identifier signals may be between one or more accessories and/or identifiers and one or more sensing devices, receivers, transmitter portions, or a combination thereof. Upon removal of an accessory, a transmitter portion may receive, stop receiving, or both one or more identifier signals from one or more identifiers located on the accessory, the accessory, or both. The change in the one or more identifier signals may result in a change in one or more status signals. The movement of the accessory and/or identifier may generate one or more status algorithms to be executed. The one or more status algorithms may convert the changed identifier signal to a changed status signal. The status signal may indicate the absence and/or movement of the one or more accessories, identifiers, or both. The removal of one or more accessories on a kiosk may result in a visual display of the accessory on a graphic interface portion.

The method may include displaying one or more characteristics related to the one or more accessories onto a graphic interface portion. The step may function to allow for a user to learn about the characteristics of the accessory, allowing for the graphic interface portion to change displayed data based on the accessory being viewed (e.g., held and removed) by the user. Based on the removal step, one or more status algorithms may be triggered. The or more status algorithms may indicate the absence, or movement, of one or more accessories relative to the display portion. This may be then result in one or more identification algorithms being executed. The one or more identification algorithms may function to identify the specific accessory removed from the display portion. The one or more identification algorithms may recognize an identifier, then based on the identifier filter the one or more databases for one or more accessories matching that identifier. The one or more identification algorithms upon determining the one or more accessories (e.g., accessory data entries), may direct one or more processors to display one or more characteristics related to the accessory on a display interface portion. For example, a graphic user interface may display a photo, price, gemstone, metal, the like, or a combination thereof related to the accessory.

The method may include displaying one or more characteristics related to one or more similar accessories on a graphic interface portion. The step may function to allow for a user to see similar accessories which may be of interest that may or may not also be on display, learn a user's personal tastes, or both. Based on the results of the identification algorithm, one or more similarity algorithms may be triggered. The one or more similarity algorithms may result in displaying of similar accessories, related accessories, or both on a graphic interface portion. The one or more similarity algorithms upon determining the one or more similar accessories, may direct one or more processors to display one or more characteristics related to the accessory on a display interface portion. The user may then be able to select, via the user interface, the similar accessory for viewing on the graphic interface portion.

The method may include storing one or more data entries related to the accessories with user information in one or more databases. This step may function to determine the tastes of a user, direct a sales associate to assist the user in identifying purchases, collecting user information, even collecting general demographic information (preferences based on store location, age, gender, etc.). Storing one or more data entries related to the user may include the user inputting one or more data entries related to the consumer via one or more user inputs. One or more customer algorithms may store the one or more accessories identified via the one or more identification algorithms, similarity algorithms, or both in the one or more databases and relate them to the customer. For example, a row in a database related to a customer may also include one or more accessory data entries, similar accessory data entries, or both. These data entries may then be accessible by a sales associate to understand the tastes of the customer.

The method may further include receiving one or more user inputs. The one or more user inputs may include receiving customer information via a keyboard, camera, microphone, or any other suitable input device. The one or more user inputs may then be transferred to one or more data processors and/or one or more storage mediums. Customer inputs may include user needs (e.g., budget, tastes, item desired, etc), customer identification information (e.g., e-mail, phone, name, gender, age, etc). Customer inputs may include photographs of a user with or without an accessory from the accessory interface portion.

The method may further include relaying one or more user inputs to one or more computing devices. The one or more user inputs may be relayed to one or more onsite computing devices separate from the kiosk. The one or more user inputs may be relayed to a computing device on-site at a retailer.

The method may include analyzing one or more user inputs with one or more algorithms. The one or more algorithms may determine other accessories similar to the accessory a user may be interested in at a kiosk based on budget, style, other needs or user inputs, or a combination thereof. The similar accessories may be transmitted to a graphic user interface for display to the user, to a computing device remote from the kiosk for display to a sales associate, or both.

The method may include using one or more algorithms to allow a user to virtually try on one or more accessories. The method may include a user taking a picture of themselves via a camera of the graphic interface portion, a camera of a mobile device, or another camera connected to the system. One or more algorithms may then allow for the photo to be displayed on a graphic user interface with one or more accessories on the user within the photograph. The method may include the user selecting other accessories for virtually trying on via the graphic user interface.

ILLUSTRATIVE EMBODIMENTS

The following descriptions of the Figures are provided to illustrate the teachings herein, but are not intended to limit the scope thereof.

FIG. 1 illustrates an interactive kiosk 10. The kiosk 10 includes a graphic interface portion 12 and an accessory interface portion 14. The graphic interface portion 12 includes a graphic interface mount 16. Residing within the graphic interface mount 16 is a graphic user interface 18, camera 20, and speaker 22. The graphic user interface 18, camera 20, and speaker 22 are shown as integrated into a tablet 19, but are not limited to a tablet configuration. The graphic interface portion 12 is attached to the accessory interface portion 14 via a support 24. The accessory interface portion 14 includes a base unit 26. The base unit 26 includes an upper surface 28 having a display portion 30. The display portion 30 resides within a well 33 formed in the upper surface 28. Projecting from the display portion 30 is a plurality of accessory retainers 32. Located on some of the accessory retainers 32 are accessories 34. The accessories 34 each have an identifier 36 (not shown) affixed thereon.

Figure 2:
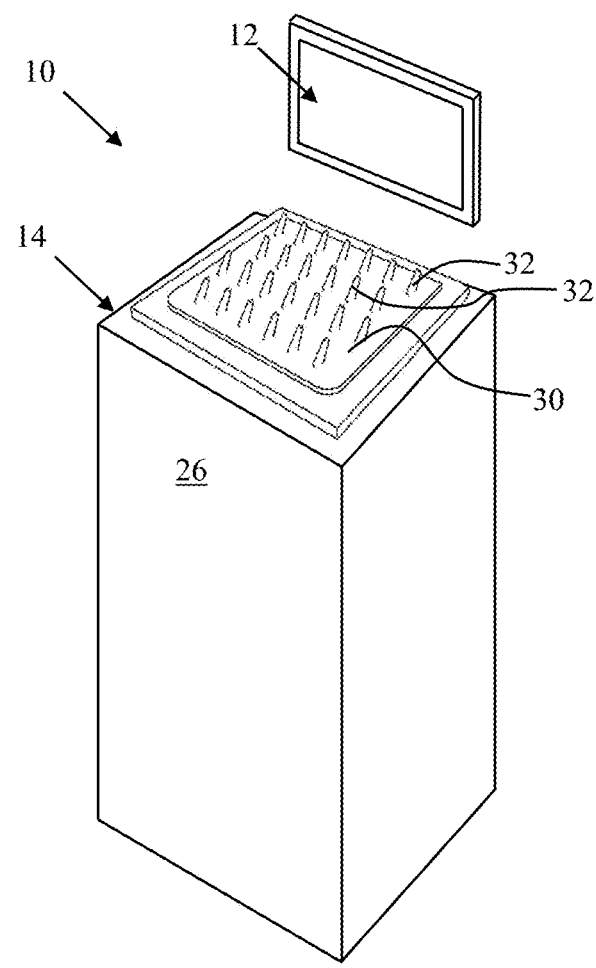
FIG. 2 is a perspective view of an interactive kiosk.

FIG. 2 illustrates an interactive kiosk 10. The kiosk 10 includes an accessory interface portion 14. The accessory interface portion 14 includes a base unit 26. The base unit 26 includes a display portion 30. The display portion includes a plurality of accessory retainers 32 projecting therefrom. The accessory retainers 32 may be inserted into accessories 34 (not shown). The accessory interface portion 14 is in communication with a graphic interface portion 12.

Figure 3:
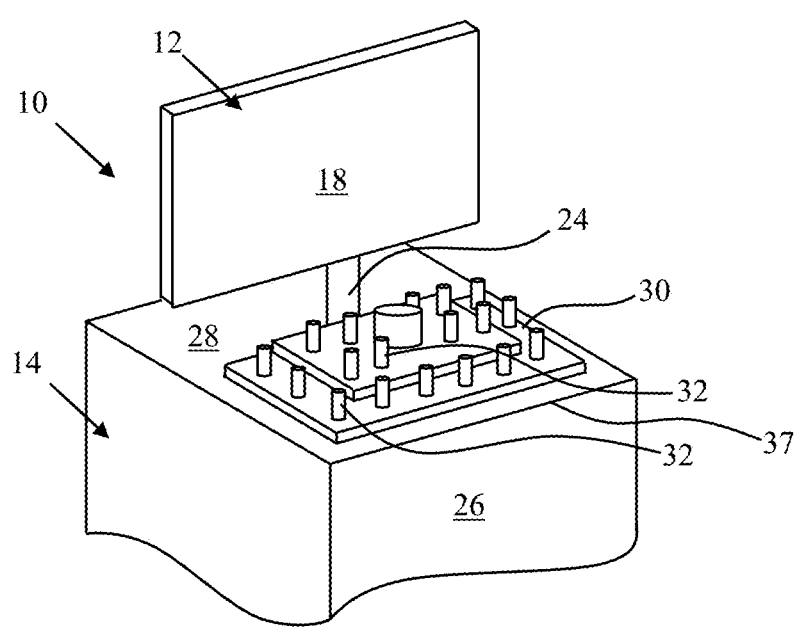
FIG. 3 is a perspective view of an interactive kiosk.

FIG. 3 illustrates an interactive kiosk 10. The kiosk 10 includes a graphic interface portion 12 attached to an accessory interface portion 14 via a support 24. The graphic interface portion 12 includes a graphic user interface 18. The graphic user interface 18 is shown as a monitor or screen. The graphic user interface 18 is distanced from an upper surface 28 of a base unit 26. The base unit 26 is part of the accessory interface portion 14. Resting on the upper surface 28 is a display portion 30. The display portion 30 includes a plurality of accessory retainers 32. The display portion 30 is located between the support 24 and a front edge 37 of the upper surface 28.

Figure 4:
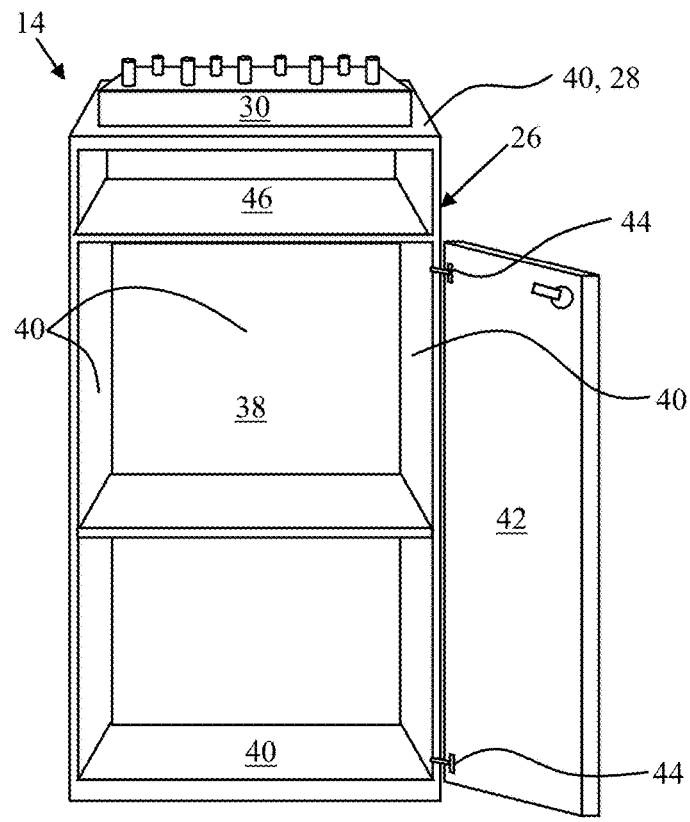
FIG. 4 is a rear elevation view of an accessory interface portion of an interactive kiosk while open.

FIG. 4 illustrates a rear of an accessory interface portion 14 of an interactive kiosk 10. The accessory interface portion 14 includes a base unit 26. The base unit 26 includes a hollow interior 38 formed by a plurality of walls 40. The base unit 26 includes a door 42 mounted via hinges 44. The door 42 may have a latch or lock 58. The base unit 26 includes an accessible hollow portion 46 adjacent to the hollow interior 38. One wall of the hollow portion 46 forms the upper surface 28. On the upper surface 28 is a display portion 30.

Figure 5:
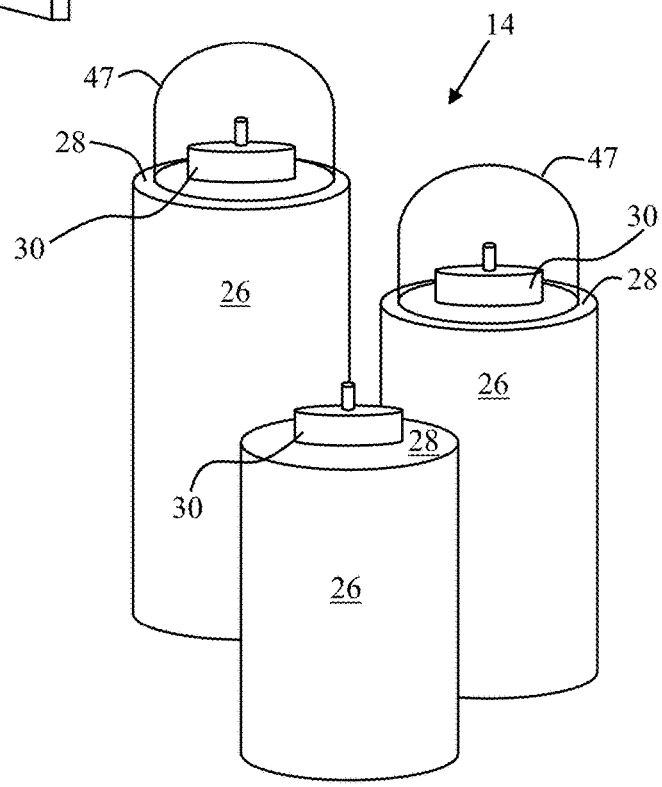
FIG. 5 illustrates a plurality of accessory interface portions forming an interactive kiosk.

FIG. 5 illustrates an accessory interface portion 14 of an interactive kiosk. The accessory interface portion 14 includes a plurality of base units 26. Each base unit 26 is cylindrically shaped. Each base unit 26 includes a display portion 30 resting upon an upper surface 28. Some of the display portions 30 include a transparent cover 47.

Figure 6:
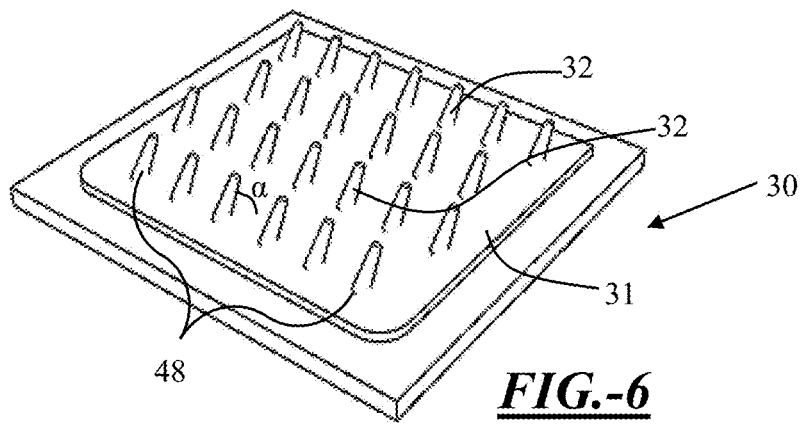
FIG. 6 illustrates a display portion.

FIG. 6 illustrates a display portion 30. The display portion 30 includes a plurality of accessory retainers 32 projecting therefrom. The accessory retainers 32 are arranged in a plurality of arrays 48. Adjacent arrays 48 are offset from each other. The accessory retainers 32 are substantially conical in shape. The accessory retainers 32 taper to a narrower width as they extend from the display portion 30. The accessory retainers 32 tilt such that they project from the display portion 30 at an angle. The accessory retainers 32 project from a base support 31 of the display portion 30.

Figure 7:
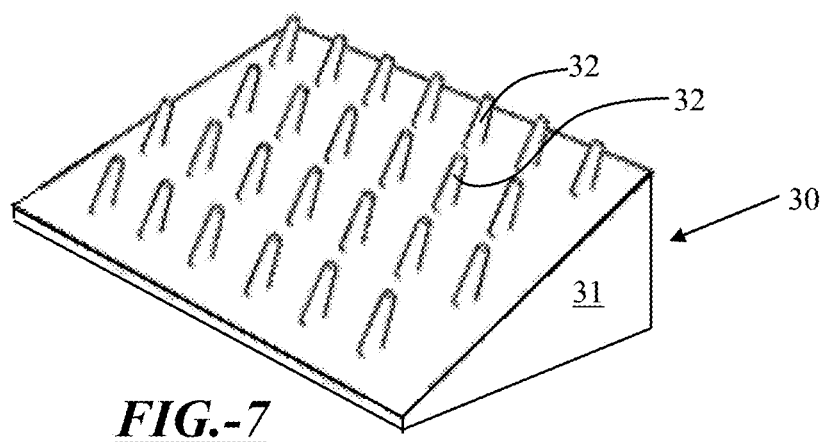
FIG. 7 illustrates a display portion.

FIG. 7 illustrates a display portion 30. The display portion 30 includes a base support 31. The display portion 30 includes a plurality of accessory retainers 32. The accessory retainers 32 project from the base support 31.

Figure 8:
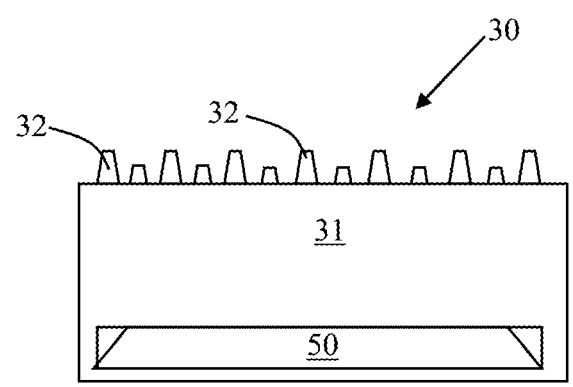
FIG. 8 is a rear elevation view of a display portion.

FIG. 8 illustrates a rear of a display portion 30. The display portion includes a base support 31. The base support 31 has a plurality of accessory retainers 32 projecting therefrom. The base support 31 has a receptacle 50. The receptacle 50 is located below the accessory retainers 32.

Figure 9A:
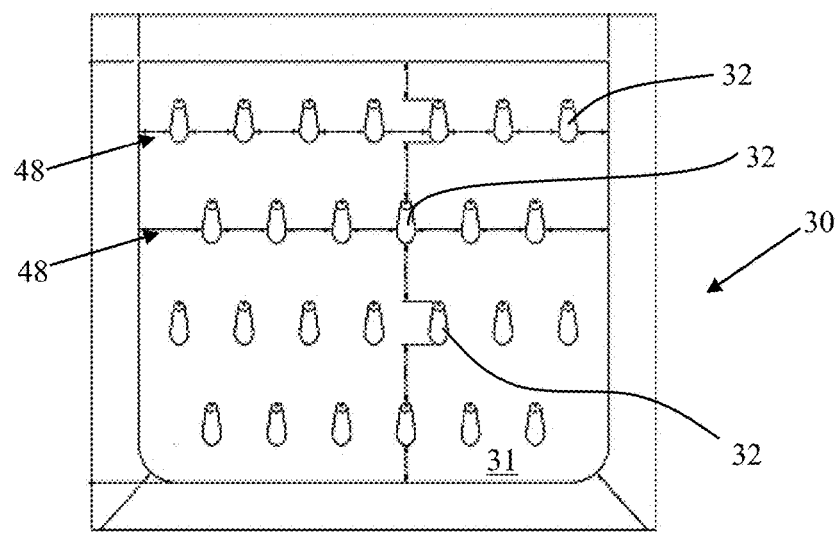
FIG. 9A is a top plan view of a display portion.
Figure 9B:
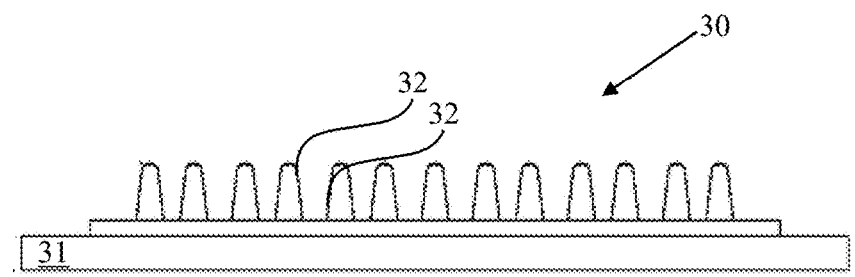
FIG. 9B is a front elevation view of a display portion.
Figure 9C:
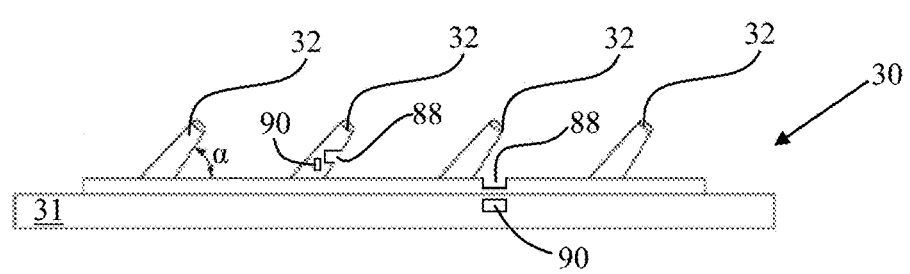
FIG. 9C is a side elevation view of a display portion.

FIGS. 9A-9C illustrate a display portion 30. The display portion 30 includes a plurality of accessory retainers 32 projecting therefrom. The accessory retainers 32 project from a base support 31. The accessory retainers 32 are arranged in a plurality of arrays 48. Adjacent arrays 48 are offset from each other. The accessory retainers 32 are substantially conical in shape. The accessory retainers 32 taper to a narrower width as they extend from the display portion 30. The accessory retainers 32 tilt such that they project from the display portion 30 at an angle α. The accessory retainers 32, the base support 31, or both may include an identifier pocket 88. Adjacent to an identifier pocket 88 may be a sensing device 90.

Figure 10:
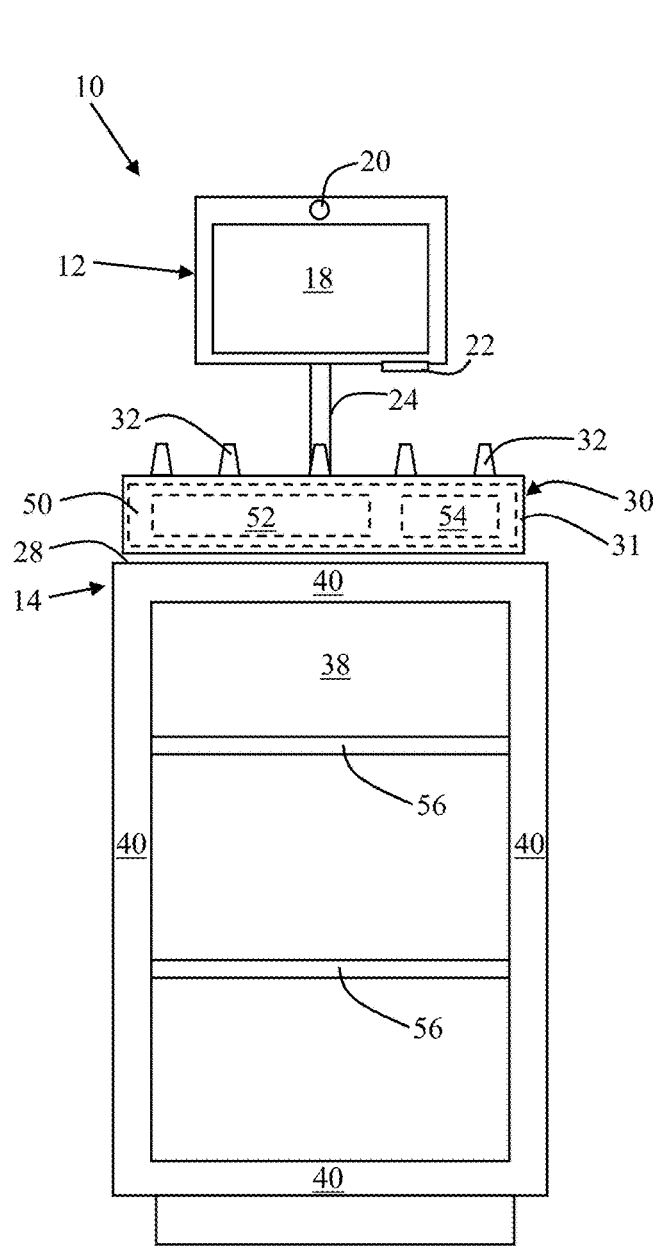
FIG. 10 is a front elevation view of an interactive kiosk.
Figure 11A:
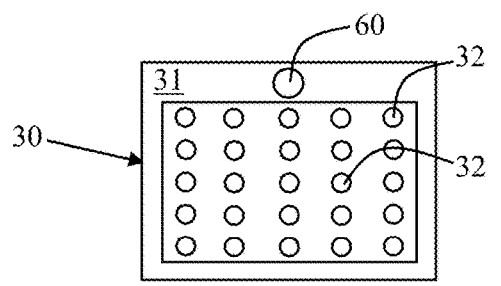
FIG. 11A is a top plan view of a display portion.
Figure 11B:
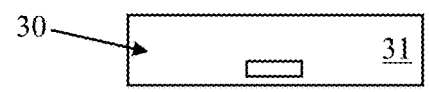
FIG. 11B is a rear elevation view of a display portion.
Figure 11C:
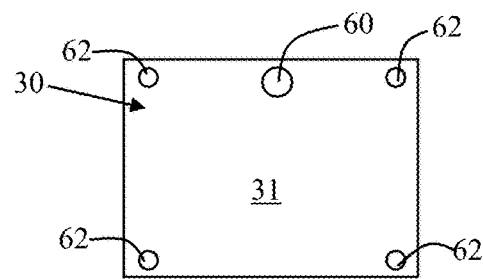
FIG. 11C is a bottom plan view of a display portion.
Figure 11D:
FIG. 11D is a front elevation view of a display portion.

FIG. 10 illustrates an interactive kiosk 10. The kiosk 10 includes a graphic interface portion 12. The graphic interface portion 12 includes a graphical user interface 18, camera 20, and speaker 22. The graphic interface portion 12 is affixed to an accessory interface portion 14 via a support 24. The accessory interface portion includes a display portion 30. The display portion 30 includes a plurality of accessory retainers 32 projecting therefrom. The display portion 30 includes a base support 31. The base support 31 includes a receptacle 50. The base support 31 houses a receiver 52. The base support 31 houses one or more power modules 54. The display portion 30 is located on an upper surface 28 of a base unit 26. The base unit 26 includes a hollow interior 38 formed by a plurality of walls 40. A plurality of shelves 56 reside within the hollow interior 38. The base unit 26 may include a door 42 (not shown) having a lock 58 (not shown).

FIG. 11A-11D illustrate a display portion 30. The display portion 30 includes a base support 31 having a plurality of accessory retainers 32. The base support 31 includes an opening 60. The display portion 30 includes a plurality of anti-scratch features 62. The anti-scratch features 62 are located on the base support 31. The anti-scratch features 62 are located opposite the accessory retainers 32.

Figure 12:
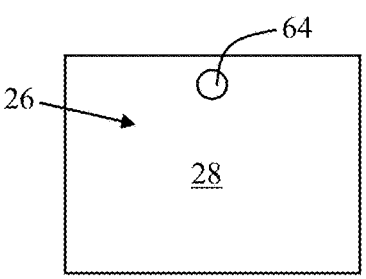
FIG. 12 is a top plan view of a base unit.

FIG. 12 illustrates a base unit 26 of an accessory interface portion 12. The base unit 26 includes an opening 64. The opening 64 is aligned with an opening 60 (not shown) of a display portion 30 (not shown), such as to allow cables from the graphic interface portion 12 to pass into the accessory interface portion 14.

Figure 13:
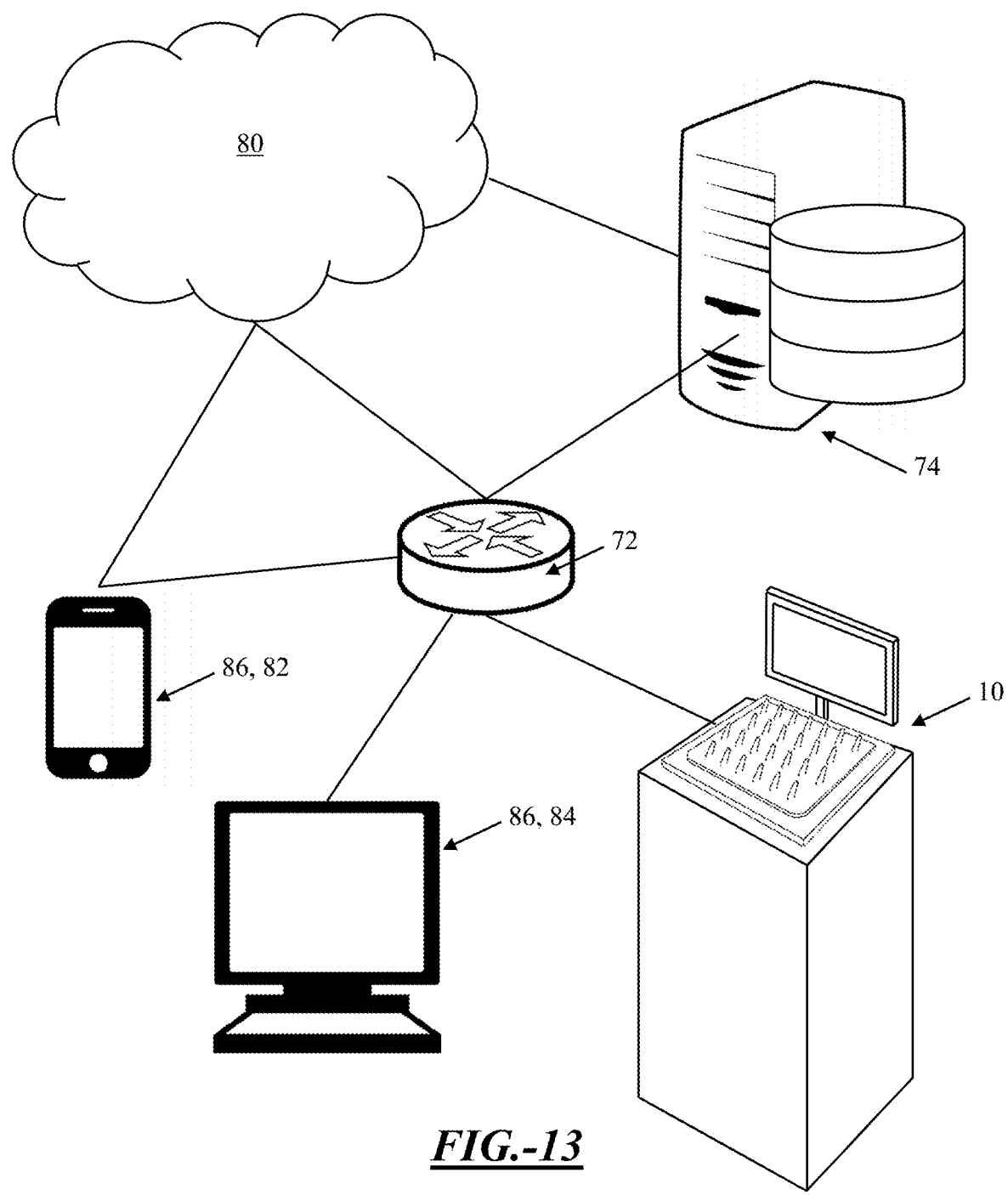
FIG. 13 illustrates a schematic of a system including an interactive kiosk system.

FIG. 13 illustrates an interactive kiosk 10 integrated into a system. The interactive kiosk 10 is in communication with a communication hub 72 (e.g., Wi-Fi Router). The communication hub 72 is able to be in communication with a plurality of computing devices 86, such as an onsite computing device 86 (e.g., computer) and mobile device 82. The communication hub 72 is in communication with a server 74. Both the communication hub 72 and the server 74 are in communication with a network 80, such as the Internet. The entire system may be part of or form a network.

Figure 14:
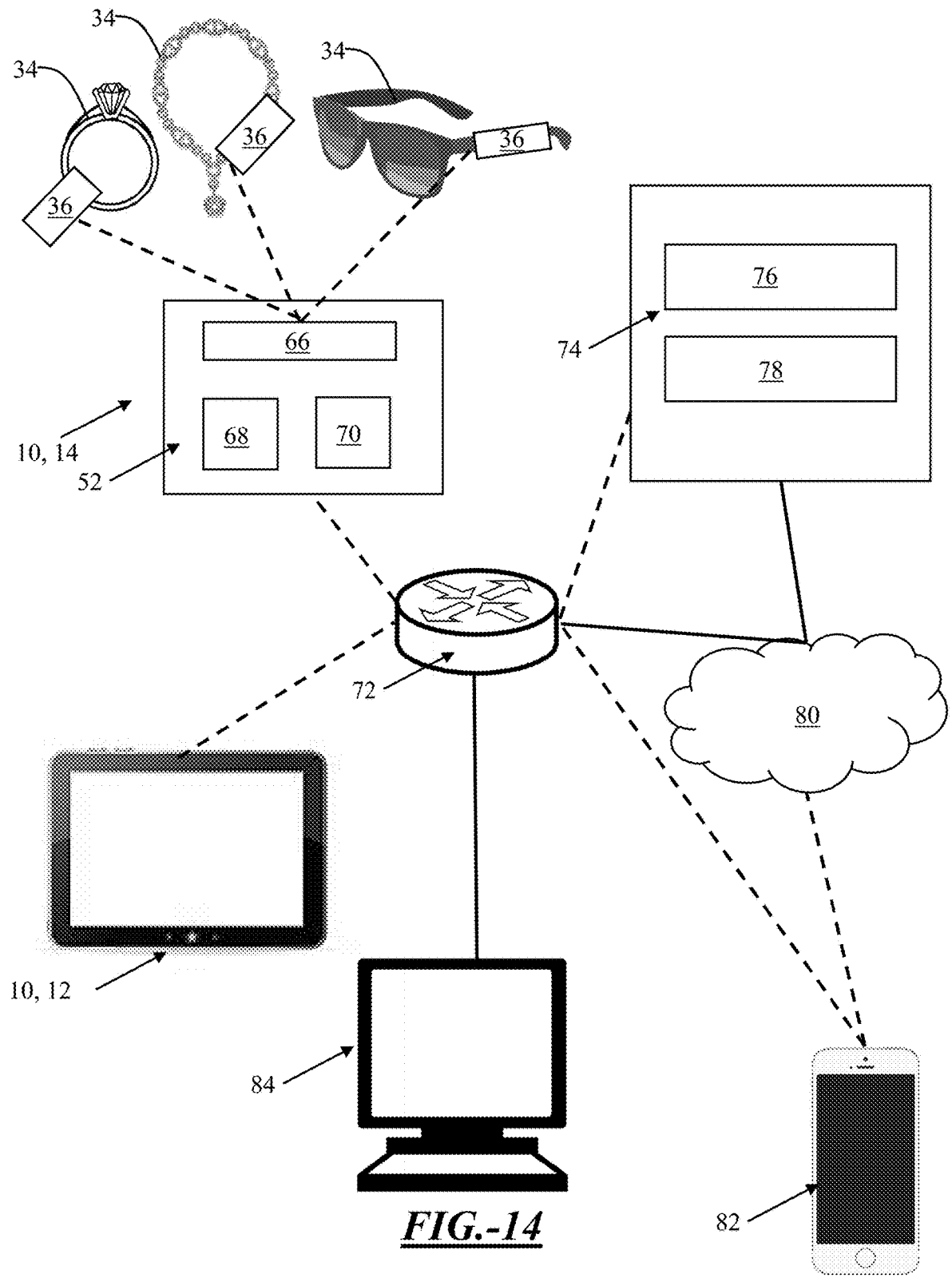
FIG. 14 illustrates a schematic of a system including an interactive kiosk system.

FIG. 14 illustrates an interactive kiosk 10 integrated into a system. A receiver 52 includes a transmitter 66. The transmitter 66 is in communication with one or more accessories 34 having an identifier 36 affixed thereon. The transmitter 66 is in communication with a micro-controller or processor 68. The receiver 52 may also include a communication module 70. The receiver 52 is in communication with a communication hub 72 (e.g., Wi-Fi Router). The communication hub 72 is in communication with a server 74. The server 74 includes one or more processors 76 and one or more storage mediums 78. Both the communication hub 72 and the server 74 are in communication with a network 80, such as the Internet. A mobile device 82 is in communication with the network 80 and the communication hub 72. An onsite computing device 84 is in communication with the communication hub 72. A graphic interface portion 12 is also in communication with the communication hub 72.

Figure 15:
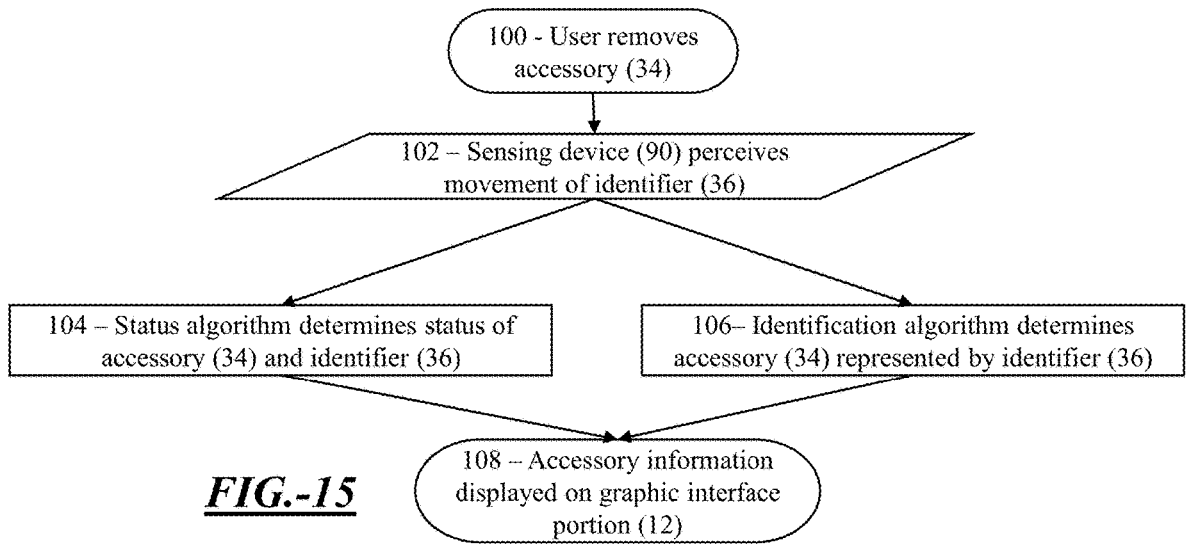
FIG. 15 illustrates a process of identifying an accessory.

FIG. 15 illustrates a flowchart of a method in which a system recognizes one or more accessories 34 removed from an accessory interface portion 14 of an interactive kiosk 10. The process begins at step 100 when a user removes an accessory 34 from an accessory interface portion 14. In particular, the user may remove the accessory 34 having an identifier 36 from a display portion 30. The removal triggers the next step 102, a sensing device 90 recognizing the movement of the identifier 36. The sensing device 90 may generate a status signal. In Step 104, the status signal may be received by a processor 76. The processor may be part of the kiosk or in communication with the kiosk. The processor 76 may execute a status algorithm. The status algorithm may determine a status, such as the absence or movement of the accessory 34 and identifier 36 from a display portion 30. The one or more identifiers 36 may be correlated to an accessory 34 by one or more identification algorithms in step 106. Steps 104 and 106 may be completed simultaneously, step 104 before 106, step 106 before 104, or any combination thereof. The one or more identification algorithms may determine the identifier 36 by a status signal, identification signal, or both from the sensing device 90. The one or more identification algorithms may correlate data saved in one or more databases to determine the accessory 34 represented by the identifier 36. Based on the removal of the accessory 34 and the identification of the accessory, a processor may then display information (one or more characteristics) about the accessory 34 on a graphic interface portion 12.

Figure 16:
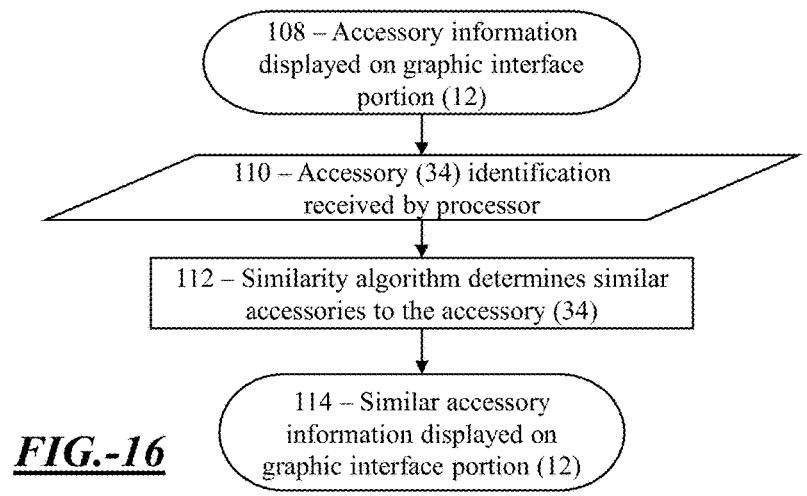
FIG. 16 illustrates a process of determining one or more similar accessories.

FIG. 16 illustrates a process if displaying one or more similar accessories relates to an accessory 34. The process may begin from any of the steps identified in FIG. 15. As an example, the process here will begin at step 108 when the accessory information related to the accessory 34 removed by a user is displayed on a graphic interface portion 12. The accessory's 34 identification is received by a processor at step 110. Upon receipt of the accessory information, a similarity algorithm is executed to achieve step 112. The similarity algorithm determines similar accessories, which may or may not be on display on the interactive kiosk 10. The similarity algorithm then directs the processor, at step 114, to display at least some of the similar accessories and their characteristics on the graphic interface portion 12.

Figure 17:
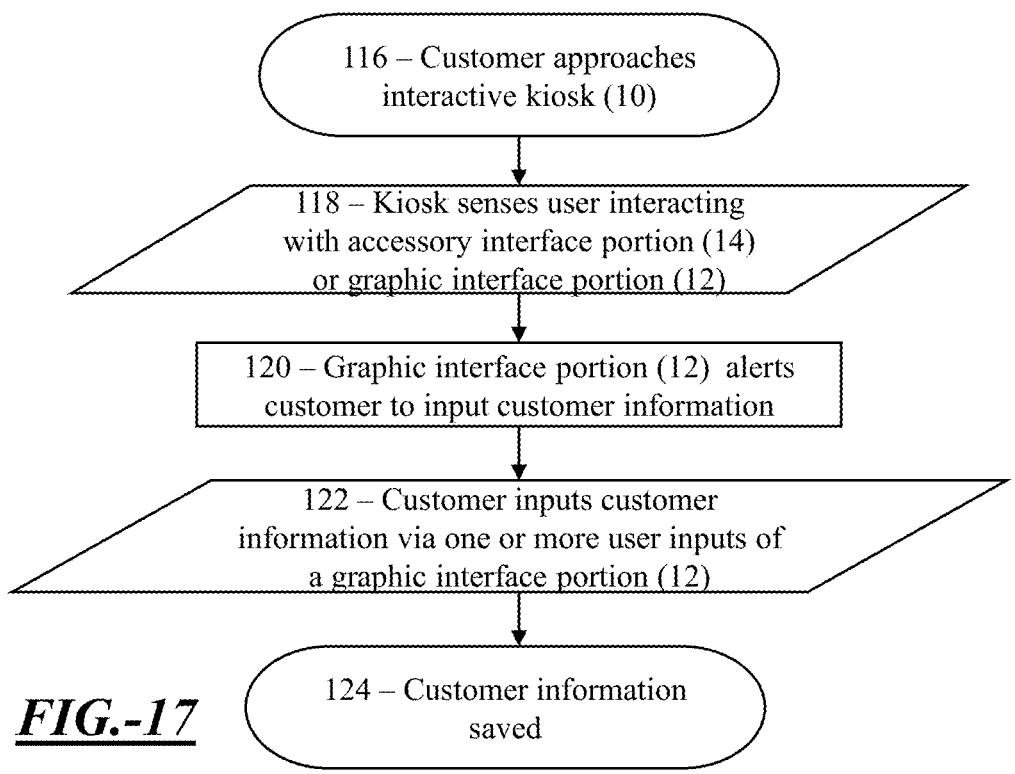
FIG. 17 illustrates a process of inputting customer information.

FIG. 17 illustrates a process of gathering customer information via an interactive kiosk. The customer information can be input by a user of a kiosk at any time from approaching the kiosk to removing one or more accessories for viewing, to placing the accessory back on the kiosk, up to finishing viewing the accessories at the kiosk. As an illustrative example, the customer information may be input before step 100 as illustrated in FIG. 15. The process may begin upon the customer approaching the kiosk 10 at step 116. The interactive kiosk 10 may detect the user's presence via one or more user inputs at step 118. The graphic interface portion 12, at step 120, may then alert a customer to input their information. The customer, at step 122, may then input customer information. The information may be input via one or more user inputs of a graphic interface portion 12. The customer information is then saved in step 124. The customer information may be saved in one or more databases, such as a customer database. The customer one or more databases may be stored in one or more non-transitory storage mediums. The customer information may then be correlated or also include interactions of the customer with the kiosk 10. Each accessory picked up by a customer may be stored and correlated to the customer in one or more databases. Each similar accessory a customer selected on a graphic interface portion may be stored and correlated to the customer. One or more characteristics of the interaction (sensed signals) with the accessory may be stored. For example, the duration of a customer holding an accessory and the amount of times the accessory is picked up by the customer may be stored. One or more preferences, as selected by the customer, may be stored. For example, a customer may indicate an accessory or similar accessory as a "favorite" which is then stored in the database and correlated to that customer.

Figure 18:
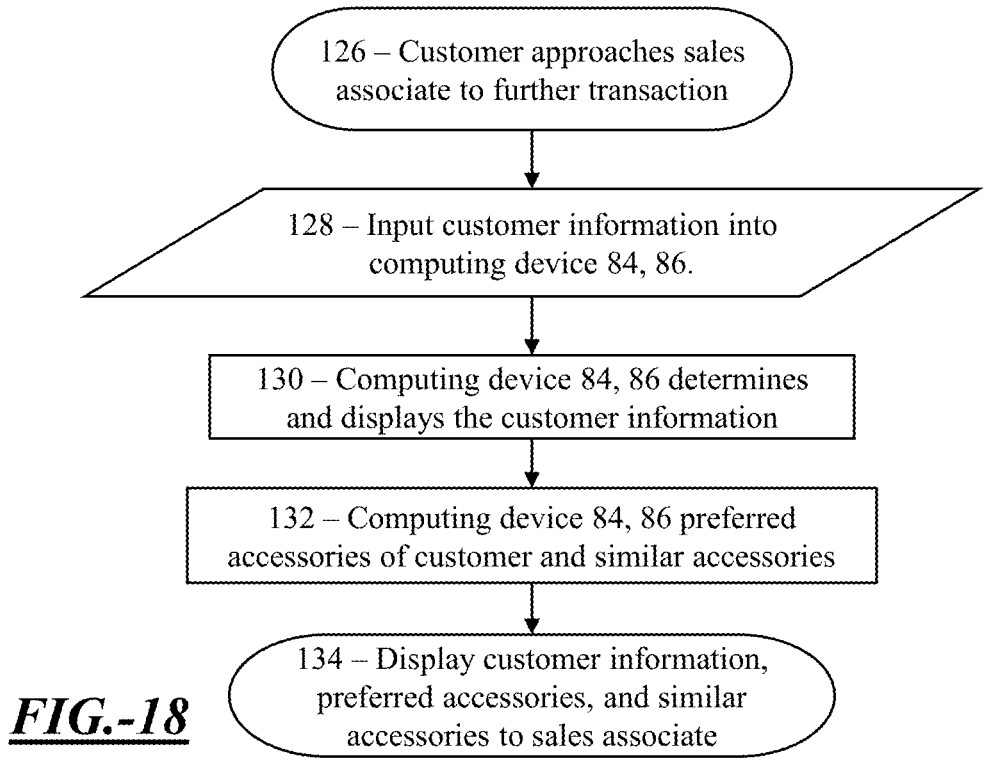
FIG. 18 illustrates a process of viewing customer information and accessory preferences.

FIG. 18 displays a process of a sales associate assisting a customer, after the customer interfaces with the interactive kiosk 10. The process begins at step 126 when the customer approaches the sales associate to further a transaction. The sales associate continues the process at step 126 by gathering customer information. This customer information may include a name or telephone number. The customer information being the same as input by the customer earlier in an interaction with the kiosk 10. The computing device 84, 86 accesses the customer information and displays it to the sales associate. The computing device 84, 86 also determines which accessories 34 the customer was most interested in at step 132, such as by duration of holding, number of times held, or even as indicated as a "favorite" by the customer. The computing device 84, 86 displays the preferred and similar accessories at step 134 to the sales associate to provide the sales associate with a beginning point in a transaction.

REFERENCE NUMBER LISTING

10 Kiosk
12 Graphic Interface Portion
14 Accessory Interface Portion
16 Graphic Interface Mount
18 Graphic User Interface 19 Tablet
20 Camera
22 Speaker
24 Support
26 Base Unit
28 Upper Surface
30 Display portion
31 Base support
32 Accessory Retainers
33 Well
34 Accessories
36 Identifier
37 Front Edge
38 Hollow Interior
40 Wall
42 Door
44 Hinge
46 Hollow Portion
47 Cover
48 Arrays
50 Receptacle
52 Receiver
54 Power modules
56 Shelf
58 Lock
60 Opening
62 Anti-scratch feature
64 Opening
66 Transmitter
68 Micro-controller/processor
70 Communication module
72 Communication hub
74 Server
76 Processor
78 Storage medium
80 Network
82 Mobile device
84 Onsite computing device
86 Computing device
88 Identifier pocket
90 Sensing device
100 Step of removing an accessory
102 Step of sensing movement of an identifier
104 Step of determining status of accessory and/or identifier
106 Step of determining accessory represented by identifier
108 Step of displaying accessory information
110 Step of receiving accessory information
112 Step of determining similar accessories
114 Step of displaying similar accessory information
116 Step of customer approaching kiosk
118 Step of kiosk sensing user interaction
120 Step of kiosk requesting customer input
122 Step of customer inputting customer information
124 Step of saving customer information
126 Step of approaching sales associate
128 Step of inputting customer information
130 Step of determining and displaying customer information
132 Step of determining preferred accessories of customer and similar accessories
134 Step of displaying preferred accessories and recommended similar accessories
α Angle Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

The invention claimed is:

1. An interactive kiosk for displaying a plurality of accessories, the interactive kiosk comprising an accessory interface portion comprising:
   a) a display portion comprising:
      i) a plurality of accessory retainers which are configured to hold the plurality of accessories, each individual accessory having one or more identifiers located thereon and associated with an individual accessory retainer, and wherein the plurality of accessories are a plurality of jewelry items;
      ii) a base support below and which supports the plurality of accessory retainers thereon or has the plurality of accessory retainers formed on an upper surface, wherein the base support has a hollow portion directly below and adjacent to the plurality of accessory retainers;
   b) one or more sensing devices configured to receive, transmit, or both receive and transmit one or more status signals to the one or more identifiers to identify a presence, a movement, an absence, or a combination thereof of one or more of the plurality of accessories from the plurality of accessory retainers and relay the one or more status signals, wherein the one or more sensing devices are housed within the hollow portion of the base support and located underneath and adjacent to the plurality of accessory retainers;
   c) one or more processors in communication with the one or more sensing devices configured to receive and analyze the one or more status signals from the one or more sensing devices; and
   d) a graphic interface portion having a graphic user interface to display information related to the one or more accessories, wherein the graphic user interface is mounted to the base support via a support affixed to the base support, wherein the support projects from the base support away from the plurality of accessory retainers, and wherein the graphic user interface is located above the plurality of accessory retainers and opposite the one or more sensing devices.

2. The interactive kiosk of claim 1, wherein the one or more sensing devices is one or more receivers, and the one or more receivers and the one or more processors are both part of a transmitter.

3. The interactive kiosk of claim 1, wherein the one or more sensing devices include one or more radio frequency transmitters, barcode readers, Bluetooth transmitters, near-field communication (NFC) transmitters, mass sensors, capacitive sensors, infrared sensors, laser sensors, conductive sensors, optical interface sensors, or any combination thereof.

4. The interactive kiosk of claim 1, wherein the display portion houses the one or more processors.

5. The interactive kiosk of claim 4, wherein each accessory retainer of the plurality of accessory retainers is individually in communication with the one or more sensing devices.

6. The interactive kiosk of claim 1, wherein the plurality of accessory retainers are integrally formed with and project from the base support, and wherein the plurality of accessory retainers are conical and taper towards their ends.

7. The interactive kiosk of claim 6, wherein the plurality of accessory retainers project at an acute angle from the display portion and/or the base support.

8. The interactive kiosk of claim 1, wherein the graphic user interface is configured to display one or more characteristics related to at least one of the plurality of accessories upon removal of the at least one of the plurality of accessories from the accessory interface portion.

9. The interactive kiosk of claim 8, wherein the graphic interface portion is configured to receive input related to a customer by one or more keyboards, cameras, microphones, or a combination thereof.

10. The interactive kiosk of claim 1, wherein the interactive kiosk is part of a system and the system includes:
   a) one or more other processors in communication with the accessory interface portion, the graphic interface portion, or both and configured to receive the one or more status signals, one or more identification signals related to the plurality of accessories, one or more input signals related to one or more user inputs, or a combination thereof; and
   b) one or more storage mediums in communication with the one or more other processors and configured to store the one or more status signals, input signals, identification signals, or any combination thereof as data entries in one or more databases, wherein the one or more storage mediums are non-transient storage mediums.

11. The interactive kiosk of claim 10, wherein the one or more storage mediums have one or more algorithms stored therein which are accessible and executable by the one or more processors, and wherein the one or more algorithms include:
   i) one or more status algorithms which are configured to determine a status of at least one of the accessories, identifiers, or both; wherein the status is the presence, the absence, the movement, or a combination thereof relative to the accessory interface portion; and
   ii) one or more identification algorithms which are configured to correlate the one or more identifiers to the plurality of accessories to determine which accessory is represented by which identifier.

12. The interactive kiosk of claim 11, wherein the one or more algorithms include one or more similarity algorithms which are configured to identify and display one or more similar accessories sharing one or more characteristics with the plurality of accessories.

13. The interactive kiosk of claim 11, wherein the one or more algorithms include one or more customer algorithms which are configured to correlate one or more preferences, behaviors, or both of a customer relative to the interactive kiosk with customer information saved within the one or more databases.

14. The interactive kiosk of claim 10, wherein the accessory interface portion and the graphic interface portion are in communication with the one or more processors through one or more communication hubs.

15. The interactive kiosk of claim 10, wherein the system includes one or more computing devices, and wherein the one or more processors, the one or more storage mediums, or both are in communication with the one or more computing devices.

16. A method of operating an interactive kiosk with a control system comprising:
   a) a user removing one or more accessories of a plurality of accessories having one or more identifiers from one of a plurality of accessory retainers of an accessory interface portion of the interactive kiosk,
      wherein the plurality of accessories are one or more jewelry items,
      wherein the accessory interface portion includes a display portion having the plurality of accessory retainers,
      wherein each of the plurality of accessory retainers are associated with an individual accessory of the plurality of accessories,
      wherein the accessory interface portion includes a base support having a hollow portion directly below and adjacent to the plurality of accessory retainers, and
      wherein the plurality of accessory retainers are integrally formed on an upper surface of the base support opposite the hollow portions;
   b) automatically detecting removal of the one or more accessories by one or more sensing devices and transmitting one or more status signals,
      wherein the one or more sensing devices are part of the accessory interface portion and in proximity to the plurality of accessory retainers,
      wherein the one or more sensing devices are housed within the hollow portion of the base support and are located underneath and adjacent to the plurality of accessory retainers;
   c) automatically identifying the one or more accessories removed by one or more processors upon receipt of the one or more status signals; and
   d) automatically displaying information related to the one or more accessories on a graphic user interface.

17. The interactive kiosk of claim 1, wherein the plurality of jewelry items includes a plurality of rings.

18. An interactive kiosk for displaying a plurality of accessories, the interactive kiosk comprising an accessory interface portion comprising:
   a) a display portion comprising:
      i) a plurality of accessory retainers which are configured to hold the plurality of accessories, each individual accessory having one or more identifiers located thereon and associated with an individual accessory retainer, and wherein the plurality of accessories are a plurality of jewelry items;
      ii) a base support which has the plurality of accessory retainers integrally formed on an upper surface, and wherein the base support has a hollow portion directly below and adjacent to the plurality of accessory retainers;
b) one or more sensing devices configured to receive, transmit, or both receive and transmit one or more status signals to the one or more identifiers to identify a presence, a movement, an absence, or a combination thereof of one or more of the plurality of accessories from the plurality of accessory retainers and relay the one or more status signals, wherein the one or more sensing devices are housed within the hollow portion of the base support and located underneath and adjacent to the plurality of accessory retainers;
c) one or more processors in communication with the one or more sensing devices configured to receive and analyze the one or more status signals from the one or more sensing devices; and
d) a graphic interface portion having a graphic user interface to display information related to the one or more accessories, wherein the graphic user interface is mounted to the base support via a support affixed to the base support, wherein the support projects from the base support away from the plurality of accessory retainers, and wherein the graphic user interface is located above the plurality of accessory retainers and opposite the one or more sensing devices.

19. The interactive kiosk of claim 18, wherein each accessory retainer of the plurality of accessory retainers is individually in communication with the one or more sensing devices.

20. The interactive kiosk of claim 19, wherein the graphic user interface is configured to display one or more characteristics related to at least one of the plurality of accessories upon removal of the at least one of the plurality of accessories from the accessory interface portion.

* * * * *